United States Patent
Shen et al.

(10) Patent No.: US 11,863,352 B2
(45) Date of Patent: Jan. 2, 2024

(54) HIERARCHICAL NETWORKING FOR NESTED CONTAINER CLUSTERS

(71) Applicant: VMware, Inc., Palo Alto, CA (US)

(72) Inventors: Jianjun Shen, Redwood City, CA (US); Mark Johnson, McKinleyville, CA (US); Gaetano Borgione, San Jose, CA (US); Benjamin John Corrie, Snohomish, WA (US); Derek Beard, Austin, TX (US); Zach James Shepherd, San Francisco, CA (US); Vinay Reddy, Pleasanton, CA (US)

(73) Assignee: VMWARE, INC., Palo Alto, CA (US)

( * ) Notice: Subject to any disclaimer, the term of this patent is extended or adjusted under 35 U.S.C. 154(b) by 38 days.

(21) Appl. No.: 17/185,844

(22) Filed: Feb. 25, 2021

(65) Prior Publication Data
US 2022/0038311 A1    Feb. 3, 2022

Related U.S. Application Data

(60) Provisional application No. 63/058,490, filed on Jul. 30, 2020.

(51) Int. Cl.
*H04L 12/66*    (2006.01)
*H04L 47/125*    (2022.01)
(Continued)

(52) U.S. Cl.
CPC ............. *H04L 12/66* (2013.01); *H04L 45/42* (2013.01); *H04L 45/44* (2013.01); *H04L 45/586* (2013.01);
(Continued)

(58) Field of Classification Search
CPC ......... H04L 12/66; H04L 45/42; H04L 45/44; H04L 45/586; H04L 47/125; H04L 63/0272; H04L 63/0263
See application file for complete search history.

(56) References Cited

U.S. PATENT DOCUMENTS

| | | |
|---|---|---|
| 6,697,360 B1 | 2/2004 | Gai et al. |
| 6,765,914 B1 | 7/2004 | Jain et al. |

(Continued)

FOREIGN PATENT DOCUMENTS

| | | |
|---|---|---|
| AU | 2004227600 B2 | 5/2009 |
| CA | 3107455 A1 | 2/2020 |

(Continued)

OTHER PUBLICATIONS

Author Unknown, "OpenShift Container Platform 4.6," Mar. 3, 2021, 41 pages, Red Hat, Inc.

(Continued)

*Primary Examiner* — Chris Parry
*Assistant Examiner* — Dixon F Dabipi
(74) *Attorney, Agent, or Firm* — ADELI LLP

(57) ABSTRACT

Some embodiments of the invention provide a novel network architecture for deploying guest clusters (GCs) including workload machines for a tenant (or other entity) within an availability zone. The novel network architecture includes a virtual private cloud (VPC) deployed in the availability zone (AZ) that includes a centralized routing element that provides access to a gateway routing element of the AZ. In some embodiments, the centralized routing element provides a set of services for packets traversing a boundary of the VPC. The services, in some embodiments, include load balancing, firewall, quality of service (QoS) and may be stateful or stateless. Guest clusters are deployed within the VPC and use the centralized routing element of the VPC to access the gateway routing element of the AZ.

10 Claims, 16 Drawing Sheets

(51) Int. Cl.
  *H04L 9/40* (2022.01)
  *H04L 45/42* (2022.01)
  *H04L 45/586* (2022.01)
  *H04L 45/44* (2022.01)

(52) U.S. Cl.
  CPC ........ *H04L 47/125* (2013.01); *H04L 63/0272* (2013.01)

(56) References Cited

U.S. PATENT DOCUMENTS

| | | |
|---|---|---|
| 7,869,439 B1 | 1/2011 | Ramberg et al. |
| 7,890,543 B2 | 2/2011 | Hunt et al. |
| 7,912,955 B1 | 3/2011 | Machiraju et al. |
| 8,627,442 B2 | 1/2014 | Ji et al. |
| 8,683,560 B1 | 3/2014 | Brooker et al. |
| 9,152,803 B2 | 10/2015 | Biswas et al. |
| 9,225,638 B2 | 12/2015 | Jain et al. |
| 9,258,312 B1 | 2/2016 | O'Neill et al. |
| 9,531,590 B2 | 12/2016 | Jain et al. |
| 9,536,077 B2 | 1/2017 | Bignon et al. |
| 9,590,901 B2 | 3/2017 | Tubaltsev et al. |
| 9,594,546 B1 | 3/2017 | Todd et al. |
| 9,674,275 B1 | 6/2017 | Engers et al. |
| 9,755,898 B2 | 9/2017 | Jain et al. |
| 9,774,537 B2 | 9/2017 | Jain et al. |
| 9,813,509 B1 | 11/2017 | Visser et al. |
| 9,825,810 B2 | 11/2017 | Jain et al. |
| 9,935,827 B2 | 4/2018 | Jain et al. |
| 9,979,641 B2 | 5/2018 | Jain et al. |
| 10,095,669 B1 | 10/2018 | Karppanen |
| 10,122,735 B1 | 11/2018 | Wohlgemuth |
| 10,129,077 B2 | 11/2018 | Jain et al. |
| 10,135,737 B2 | 11/2018 | Jain et al. |
| 10,193,977 B2 | 1/2019 | Ke et al. |
| 10,205,701 B1 | 2/2019 | Voss et al. |
| 10,225,137 B2 | 3/2019 | Jain et al. |
| 10,257,095 B2 | 4/2019 | Jain et al. |
| 10,270,796 B1 | 4/2019 | Veeraswamy et al. |
| 10,320,679 B2 | 6/2019 | Jain et al. |
| 10,341,233 B2 | 7/2019 | Jain et al. |
| 10,496,605 B2 | 12/2019 | Melnik et al. |
| 10,516,568 B2 | 12/2019 | Jain et al. |
| 10,547,521 B1 | 1/2020 | Roy et al. |
| 10,594,743 B2 | 3/2020 | Hong et al. |
| 10,609,091 B2 | 3/2020 | Hong et al. |
| 10,613,888 B1 | 4/2020 | Mentz et al. |
| 10,628,144 B2 | 4/2020 | Myneni et al. |
| 10,652,143 B2 | 5/2020 | Ravinoothala et al. |
| 10,693,782 B2 | 6/2020 | Jain et al. |
| 10,708,368 B1 | 7/2020 | Young et al. |
| 10,725,836 B2 | 7/2020 | Savenkov et al. |
| 10,795,909 B1 | 10/2020 | Bond et al. |
| 10,812,337 B2 | 10/2020 | Vaidya et al. |
| 10,841,226 B2 * | 11/2020 | Mariappan ............ H04L 47/125 |
| 10,942,788 B2 | 3/2021 | Palavalli et al. |
| 10,944,691 B1 | 3/2021 | Raut et al. |
| 10,951,661 B1 | 3/2021 | Medan et al. |
| 10,972,341 B2 | 4/2021 | Mudigonda |
| 10,972,386 B2 | 4/2021 | Mackie et al. |
| 11,074,091 B1 | 7/2021 | Nayakbomman et al. |
| 11,086,700 B2 | 8/2021 | Myneni et al. |
| 11,159,366 B1 | 10/2021 | Gawade et al. |
| 11,190,491 B1 | 11/2021 | Kaciulis et al. |
| 11,194,483 B1 | 12/2021 | Dontu et al. |
| 11,277,309 B2 | 3/2022 | Vaidya et al. |
| 11,316,822 B1 * | 4/2022 | Gawade ............. G06F 11/2025 |
| 11,436,057 B2 | 9/2022 | Shen et al. |
| 11,500,688 B2 | 11/2022 | Liu et al. |
| 11,570,146 B2 | 1/2023 | Liu et al. |
| 11,606,254 B2 | 3/2023 | Liu et al. |
| 11,671,401 B2 | 6/2023 | Singh et al. |
| 2004/0098154 A1 | 5/2004 | McCarthy |
| 2005/0129019 A1 | 6/2005 | Cheriton |
| 2007/0244962 A1 | 10/2007 | Laadan et al. |
| 2007/0245334 A1 | 10/2007 | Nieh et al. |
| 2010/0149996 A1 | 6/2010 | Sun |
| 2010/0177674 A1 | 7/2010 | Aggarwal |
| 2010/0211815 A1 | 8/2010 | Mankovskii et al. |
| 2010/0246545 A1 | 9/2010 | Berzin |
| 2010/0293378 A1 | 11/2010 | Xiao et al. |
| 2011/0161988 A1 | 6/2011 | Kashyap |
| 2011/0194494 A1 | 8/2011 | Aso et al. |
| 2011/0282936 A1 | 11/2011 | Chekhanovskiy et al. |
| 2011/0289508 A1 * | 11/2011 | Fell ................. H04L 67/1004 718/105 |
| 2012/0117226 A1 | 5/2012 | Tanaka et al. |
| 2012/0150912 A1 | 6/2012 | Ripberger |
| 2012/0304275 A1 | 11/2012 | Ji et al. |
| 2013/0018994 A1 | 1/2013 | Flavel et al. |
| 2013/0019314 A1 | 1/2013 | Ji et al. |
| 2013/0125230 A1 | 5/2013 | Koponen et al. |
| 2013/0174168 A1 | 7/2013 | Abuelsaad et al. |
| 2013/0266019 A1 | 10/2013 | Qu et al. |
| 2013/0283339 A1 | 10/2013 | Biswas et al. |
| 2014/0036730 A1 | 2/2014 | Nellikar et al. |
| 2014/0129690 A1 | 5/2014 | Jaisinghani et al. |
| 2014/0164897 A1 | 6/2014 | Yucel et al. |
| 2014/0223556 A1 | 8/2014 | Bignon et al. |
| 2014/0237100 A1 | 8/2014 | Cohn et al. |
| 2014/0258479 A1 | 9/2014 | Tenginakai et al. |
| 2015/0063166 A1 | 3/2015 | Sif et al. |
| 2015/0081767 A1 | 3/2015 | Evens |
| 2015/0100704 A1 | 4/2015 | Davie et al. |
| 2015/0172093 A1 | 6/2015 | Kaneko et al. |
| 2015/0222598 A1 | 8/2015 | Koponen et al. |
| 2015/0249574 A1 | 9/2015 | Zhang |
| 2015/0263899 A1 | 9/2015 | Tubaltsev et al. |
| 2015/0263946 A1 | 9/2015 | Tubaltsev et al. |
| 2015/0317169 A1 | 11/2015 | Sinha et al. |
| 2015/0348044 A1 | 12/2015 | Smith |
| 2015/0379281 A1 | 12/2015 | Feroz et al. |
| 2016/0036860 A1 | 2/2016 | Xing et al. |
| 2016/0080422 A1 | 3/2016 | Belgodere et al. |
| 2016/0094454 A1 | 3/2016 | Jain et al. |
| 2016/0094457 A1 | 3/2016 | Jain et al. |
| 2016/0094650 A1 | 3/2016 | Rio |
| 2016/0094661 A1 | 3/2016 | Jain et al. |
| 2016/0182293 A1 | 6/2016 | Benedetto et al. |
| 2016/0217301 A1 | 7/2016 | Watanabe et al. |
| 2016/0239326 A1 | 8/2016 | Kaplan et al. |
| 2016/0241436 A1 | 8/2016 | Fourie et al. |
| 2016/0254964 A1 | 9/2016 | Benc |
| 2016/0269318 A1 | 9/2016 | Su et al. |
| 2016/0294612 A1 | 10/2016 | Ravinoothala et al. |
| 2016/0315809 A1 | 10/2016 | McMurry et al. |
| 2016/0335129 A1 | 11/2016 | Behera et al. |
| 2016/0337334 A1 | 11/2016 | Murr |
| 2017/0005923 A1 | 1/2017 | Babakian |
| 2017/0005986 A1 | 1/2017 | Bansal et al. |
| 2017/0031956 A1 | 2/2017 | Burk et al. |
| 2017/0063632 A1 | 3/2017 | Goliya et al. |
| 2017/0063782 A1 | 3/2017 | Jain et al. |
| 2017/0085561 A1 | 3/2017 | Han et al. |
| 2017/0093790 A1 | 3/2017 | Banerjee et al. |
| 2017/0171144 A1 | 6/2017 | Sagiraju et al. |
| 2017/0177394 A1 | 6/2017 | Barzik et al. |
| 2017/0195210 A1 | 7/2017 | Jacob et al. |
| 2017/0206034 A1 | 7/2017 | Fetik |
| 2017/0207963 A1 | 7/2017 | Mehta et al. |
| 2017/0286698 A1 | 10/2017 | Shetty et al. |
| 2017/0317954 A1 | 11/2017 | Masurekar et al. |
| 2017/0332307 A1 | 11/2017 | Pan |
| 2017/0353351 A1 | 12/2017 | Cheng et al. |
| 2017/0366416 A1 | 12/2017 | Beecham et al. |
| 2017/0374106 A1 | 12/2017 | Hamou et al. |
| 2018/0063194 A1 * | 3/2018 | Vaidya .................. G06F 9/5077 |
| 2018/0083835 A1 | 3/2018 | Cole et al. |
| 2018/0089299 A1 | 3/2018 | Collins et al. |
| 2018/0114012 A1 | 4/2018 | Sood et al. |
| 2018/0123943 A1 | 5/2018 | Lee et al. |
| 2018/0131675 A1 | 5/2018 | Sengupta et al. |
| 2018/0167453 A1 | 6/2018 | Luo |
| 2018/0167458 A1 | 6/2018 | Ould-Brahim et al. |

(56) References Cited

U.S. PATENT DOCUMENTS

| | | |
|---|---|---|
| 2018/0167487 A1 | 6/2018 | Vyas et al. |
| 2018/0183757 A1 | 6/2018 | Gunda et al. |
| 2018/0205605 A1 | 7/2018 | Mittal et al. |
| 2018/0234459 A1* | 8/2018 | Kung ............... H04L 63/20 |
| 2018/0248827 A1 | 8/2018 | Scharber et al. |
| 2018/0262424 A1 | 9/2018 | Roeland et al. |
| 2018/0287996 A1 | 10/2018 | Tripathy et al. |
| 2018/0295036 A1 | 10/2018 | Krishnamurthy et al. |
| 2018/0331885 A1 | 11/2018 | Raymond et al. |
| 2018/0359323 A1 | 12/2018 | Madden |
| 2019/0034237 A1 | 1/2019 | Siddappa et al. |
| 2019/0036868 A1 | 1/2019 | Chandrashekhar et al. |
| 2019/0042518 A1 | 2/2019 | Marolia et al. |
| 2019/0068544 A1 | 2/2019 | Hao et al. |
| 2019/0079751 A1 | 3/2019 | Foskett et al. |
| 2019/0097879 A1 | 3/2019 | Cai et al. |
| 2019/0102280 A1 | 4/2019 | Caldato et al. |
| 2019/0103992 A1 | 4/2019 | Cidon et al. |
| 2019/0132220 A1 | 5/2019 | Boutros et al. |
| 2019/0132221 A1 | 5/2019 | Boutros et al. |
| 2019/0132283 A1 | 5/2019 | Ballard et al. |
| 2019/0140895 A1 | 5/2019 | Ennis, Jr. et al. |
| 2019/0140921 A1 | 5/2019 | Xu et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0171650 A1 | 6/2019 | Botev et al. |
| 2019/0173780 A1* | 6/2019 | Hira ............... H04L 45/22 |
| 2019/0229987 A1 | 7/2019 | Shelke et al. |
| 2019/0238363 A1 | 8/2019 | Boutros et al. |
| 2019/0238364 A1 | 8/2019 | Boutros et al. |
| 2019/0245757 A1 | 8/2019 | Meyer et al. |
| 2019/0273683 A1 | 9/2019 | Jiang et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0356693 A1 | 11/2019 | Cahana et al. |
| 2019/0384645 A1 | 12/2019 | Palavalli et al. |
| 2019/0386877 A1 | 12/2019 | Vaidya et al. |
| 2020/0065080 A1 | 2/2020 | Myneni et al. |
| 2020/0065166 A1 | 2/2020 | Myneni et al. |
| 2020/0073692 A1* | 3/2020 | Rao ............... H04L 41/0893 |
| 2020/0076684 A1 | 3/2020 | Naveen et al. |
| 2020/0076685 A1 | 3/2020 | Vaidya et al. |
| 2020/0076734 A1 | 3/2020 | Naveen et al. |
| 2020/0084112 A1 | 3/2020 | Kandaswamy et al. |
| 2020/0092275 A1 | 3/2020 | Seed et al. |
| 2020/0112504 A1 | 4/2020 | Osman |
| 2020/0213366 A1 | 7/2020 | Hong et al. |
| 2020/0250009 A1 | 8/2020 | Jaeger et al. |
| 2020/0250074 A1 | 8/2020 | Zhang et al. |
| 2020/0252376 A1 | 8/2020 | Feng et al. |
| 2020/0301801 A1* | 9/2020 | Hegde ............... G06F 11/302 |
| 2020/0314006 A1 | 10/2020 | Mackie et al. |
| 2020/0314173 A1* | 10/2020 | Pahwa ............... H04L 67/10 |
| 2020/0344120 A1 | 10/2020 | Pianigiani et al. |
| 2020/0366558 A1 | 11/2020 | Vaidya et al. |
| 2020/0374186 A1 | 11/2020 | Scott |
| 2020/0379812 A1 | 12/2020 | Ranjan et al. |
| 2020/0382556 A1 | 12/2020 | Woolward et al. |
| 2020/0401457 A1 | 12/2020 | Singhal et al. |
| 2020/0403853 A1 | 12/2020 | Garipally et al. |
| 2020/0403860 A1 | 12/2020 | Lewis et al. |
| 2020/0409671 A1 | 12/2020 | Mazurskiy |
| 2021/0004292 A1 | 1/2021 | Zlotnick et al. |
| 2021/0064442 A1 | 3/2021 | Alluboyina et al. |
| 2021/0099335 A1 | 4/2021 | Li |
| 2021/0165695 A1 | 6/2021 | Palavalli et al. |
| 2021/0200814 A1 | 7/2021 | Tal et al. |
| 2021/0243164 A1 | 8/2021 | Murray et al. |
| 2021/0273946 A1 | 9/2021 | Iqbal et al. |
| 2021/0306285 A1 | 9/2021 | Hirasawa et al. |
| 2021/0311803 A1 | 10/2021 | Zhou et al. |
| 2021/0314190 A1 | 10/2021 | Liu et al. |
| 2021/0314239 A1 | 10/2021 | Shen et al. |
| 2021/0314240 A1 | 10/2021 | Liu et al. |
| 2021/0314300 A1 | 10/2021 | Shen et al. |
| 2021/0314361 A1 | 10/2021 | Zhou et al. |
| 2021/0314388 A1* | 10/2021 | Zhou ............... H04L 41/0806 |
| 2021/0328858 A1 | 10/2021 | Asveren et al. |
| 2021/0349765 A1 | 11/2021 | Zhou et al. |
| 2021/0352044 A1 | 11/2021 | Asveren et al. |
| 2021/0365308 A1 | 11/2021 | Myneni et al. |
| 2021/0397466 A1 | 12/2021 | McKee et al. |
| 2021/0409336 A1* | 12/2021 | Talur ............... H04L 69/22 |
| 2022/0012045 A1 | 1/2022 | Rudraraju et al. |
| 2022/0035651 A1 | 2/2022 | Maurya et al. |
| 2022/0070250 A1 | 3/2022 | Baid et al. |
| 2022/0158926 A1 | 5/2022 | Wennerström et al. |
| 2022/0182439 A1 | 6/2022 | Zhou et al. |
| 2022/0200865 A1 | 6/2022 | Vaidya et al. |
| 2022/0210113 A1 | 6/2022 | Pillareddy et al. |
| 2022/0278926 A1 | 9/2022 | Sharma et al. |
| 2022/0303246 A1 | 9/2022 | Miriyala et al. |
| 2022/0311738 A1 | 9/2022 | Singh et al. |
| 2022/0321495 A1 | 10/2022 | Liu et al. |
| 2022/0400053 A1 | 12/2022 | Liu et al. |
| 2023/0070224 A1 | 3/2023 | Huo et al. |
| 2023/0104568 A1 | 4/2023 | Miriyala et al. |
| 2023/0179573 A1 | 6/2023 | Sosnovich et al. |

FOREIGN PATENT DOCUMENTS

| | | |
|---|---|---|
| CN | 106789367 A | 5/2017 |
| CN | 107947961 A | 4/2018 |
| CN | 108809722 A | 11/2018 |
| CN | 110531987 A | 12/2019 |
| CN | 110611588 A | 12/2019 |
| CN | 111327640 A | 6/2020 |
| CN | 111371627 A | 7/2020 |
| CN | 111865643 A | 10/2020 |
| CN | 113141386 A | 7/2021 |
| EP | 2464151 A2 | 6/2012 |
| EP | 2464152 A2 | 6/2012 |
| EP | 2830270 A1 | 1/2015 |
| EP | 3316532 A1 | 5/2018 |
| EP | 3617879 A1 | 3/2020 |
| JP | 2011070707 A | 4/2011 |
| JP | 2012099048 A | 5/2012 |
| JP | 2015115043 A | 6/2015 |
| JP | 2018523932 A | 8/2018 |
| WO | 2011159842 A2 | 12/2011 |
| WO | 2016160523 A1 | 10/2016 |
| WO | 2018044352 A1 | 3/2018 |
| WO | 2019241086 A1 | 12/2019 |
| WO | 2020041073 A1 | 2/2020 |
| WO | 2021196080 A1 | 10/2021 |
| WO | 2022026028 A1 | 2/2022 |
| WO | 2022204941 A9 | 10/2022 |

OTHER PUBLICATIONS

Author Unknown, "E-Security Begins with Sound Security Policies," Jun. 14, 2001, 23 pages, Symantec Corporation.

Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.

Non-published Commonly Owned U.S. Appl. No. 16/897,627, filed Jun. 10, 2020, 85 pages, VMware, Inc.

Non-published Commonly Owned U.S. Appl. No. 16/897,640, filed Jun. 10, 2020, 84 pages, VMware, Inc.

Non-published Commonly Owned U.S. Appl. No. 16/897,652, filed Jun. 10, 2020, 84 pages, VMware, Inc.

Non-published Commonly Owned U.S. Appl. No. 16/897,666, filed Jun. 10, 2020, 78 pages, VMware, Inc.

Non-published Commonly Owned U.S. Appl. No. 16/897,680, filed Jun. 10, 2020, 78 pages, VMware, Inc.

Non-published Commonly Owned U.S. Appl. No. 16/897,695, filed Jun. 10, 2020, 77 pages, VMware, Inc.

(56) References Cited

OTHER PUBLICATIONS

Non-published Commonly Owned U.S. Appl. No. 16/897,704, filed Jun. 10, 2020, 85 pages, VMware, Inc.
Non-published Commonly Owned U.S. Appl. No. 16/897,715, filed Jun. 10, 2020, 70 pages, VMware, Inc.
Non-published Commonly Owned U.S. Appl. No. 17/072,115, filed Oct. 16, 2020, 49 pages, VMware, Inc.
Non-published commonly owned U.S. Appl. No. 17/112,689, filed Dec. 4, 2020, 63 pages, VMware, Inc.
Non-published Commonly Owned U.S. Appl. No. 17/176,191, filed Feb. 16, 2021, 36 pages, VMware, Inc.
Rouse, Margaret, "What is SDDC (software-defined data center)?—Definition from WhatIs.com," Mar. 2017, 5 pages, TechTarget.com.
Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.
Abhashkumar, Anubhavnidhi, et al., "Supporting Diverse Dynamic Intent-based Policies Using Janus," CoNEXT 17, Dec. 12-15, 2017, 14 pages, ACM, Incheon, KR.
Abwnawar, Nasser, "A Policy-Based Management Approach to Security in Cloud Systems," Feb. 2020, 184 pages, De Monfort University, Leicester, UK.
Author Unknown, "Kubernetes Core Concepts for Azure Kubernetes Service (AKS)", Jun. 3, 2019, 6 pages, retrieved from https://docs.microsoft.com/en-us/azure/aks/concepts-clusters-workloads.
Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.
Sayfan, Gigi, "Mastering Kubernetes: Automating container deployment and management," May 2017, 426 pages, Packt Publishing, Birmingham, UK.
Wodicka, Brent, "A Developer's Guide to Container Orchestration, Kubernetes, & AKS," Mar. 19, 2019, 5 pages, AIS, Reston, VA, USA.
Non-Published Commonly Owned U.S. Appl. No. 17/692,634, filed Mar. 11, 2022, 42 pages, VMware, Inc.
Author Unknown, "NSX vSphere API Guide—NSX 6.2 for vSphere," Jan. 6, 2017, 400 pages, VMware, Inc.
Author Unknown, "Advanced Networking Features in Kubernetes and Container Bare Metal," Document 606835-001, Dec. 2018, 42 pages, Intel Corporation.
Author Unknown, "Chapter 4: Default Security Policy," IBM Security Access Manager Version 9.0, Oct. 2015, 18 pages.
Author Unknown, "Containers and Container Networking for Network Engineers: VMware NSX Container Networking," Jan. 2018, 58 pages, VMware, Inc.
Balla, David, et al., "Adaptive Scaling of Kubernetes Pods," NOMS 2020—2020 IEEE/IFIP Network Operations and Management Symposium, Apr. 20-24, 2020, 5 pages, IEEE, Budapest, Hungary.

* cited by examiner

HIERARCHICAL NETWORKING FOR NESTED CONTAINER CLUSTERS

BACKGROUND

With the recent increase in cloud native applications, today there is more demand than ever for fast deployment of on-demand networking for connecting machines that are deployed in software defined datacenters (SDDC). It is desirable to provide auto-deployed networking solutions as many compute-cluster administrators do not have extensive knowledge of networking. However, for administrators who wish to adjust their system's networking, it is desirable to provide such administrators with the ability to configure and customize their network deployments.

Additionally, an administrator may wish to efficiently allocate resources and automate the application of certain policies among a number of related compute clusters while maintain system visibility for analytics.

SUMMARY

Some embodiments of the invention provide a novel network architecture for deploying guest clusters (GCs) including workload machines for a tenant (or other entity) within an availability zone (e.g., a datacenter providing a set of hardware resources). The novel network architecture includes a virtual private cloud (VPC) deployed in the availability zone (AZ) that includes a centralized routing element that provides access to a gateway routing element, or set of gateway routing elements, of the AZ. In some embodiments, the centralized routing element provides a set of services for packets traversing a boundary of the VPC. The services, in some embodiments, include load balancing, firewall, quality of service (QoS) and may be stateful or stateless. Guest clusters are deployed within the VPC and use the centralized routing element of the VPC to access the gateway routing element of the AZ. The deployed GCs, in some embodiments, include distributed routing elements that (1) provide access to the centralized routing element of the VPC for components of the GC and (2) execute on host computers along with workload machines of the GC.

The centralized routing element, in some embodiments, includes a service router (or routing element) of the VPC network and a distributed router (or routing element) of the VPC network. The service router provides routing operations and a set of stateful services while the distributed router provides stateless routing and, in some embodiments, stateless services. In some embodiments, the centralized routing element includes a set of centralized routing elements each executing the service router of the VPC network and the distributed router of the VPC network. The service router of the VPC, in some embodiments, executes in each of the centralized routing elements in the set of centralized routing elements, but does not execute in other machines of the VPC. The distributed router of the VPC executes in each host computer that hosts a machine of the VPC.

The centralized routing elements in the set of centralized routing elements, in some embodiments, are configured in an active-standby mode, wherein a particular centralized routing element receives all the traffic traversing the set of centralized routing elements. In other embodiments, the centralized routing elements in the set of centralized routing elements are configured in an active-active mode in which each centralized routing element receives some traffic traversing the set of centralized routing elements.

Resources allocated to the VPC, in some embodiments, are inherited by the guest clusters such that the guest clusters use the resources allocated to the VPC. In some embodiments, the resources include processing resources, storage resources, and network resources (e.g., IP addresses assigned to the VPC, bandwidth allocated to the centralized routing element of the VPC, etc.). The GC, in some embodiments, also inherit (e.g., make use of) at least one service machine of the VPC that provides a service, or set of services, to the machines of the VPC and the machines of the GCs. In addition to inheriting the physical resources allocated to the VPC, in some embodiments, the guest clusters also inherit network policies and service definitions.

The GCs, in some embodiments, are implemented as Kubernetes clusters. In other embodiments, the GCs are non-Kubernetes clusters, while in yet other embodiments, the GC include both Kubernetes and non-Kubernetes clusters. The VPC, in some embodiments, is a Kubernetes cluster, while in other embodiments, the VPC is a non-Kubernetes cluster that includes at least one of a virtual machine and a non-Kubernetes Pod.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings and the Claims is needed. Moreover, the claimed subject matters are not to be limited by the illustrative details in the Summary, the Detailed Description and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
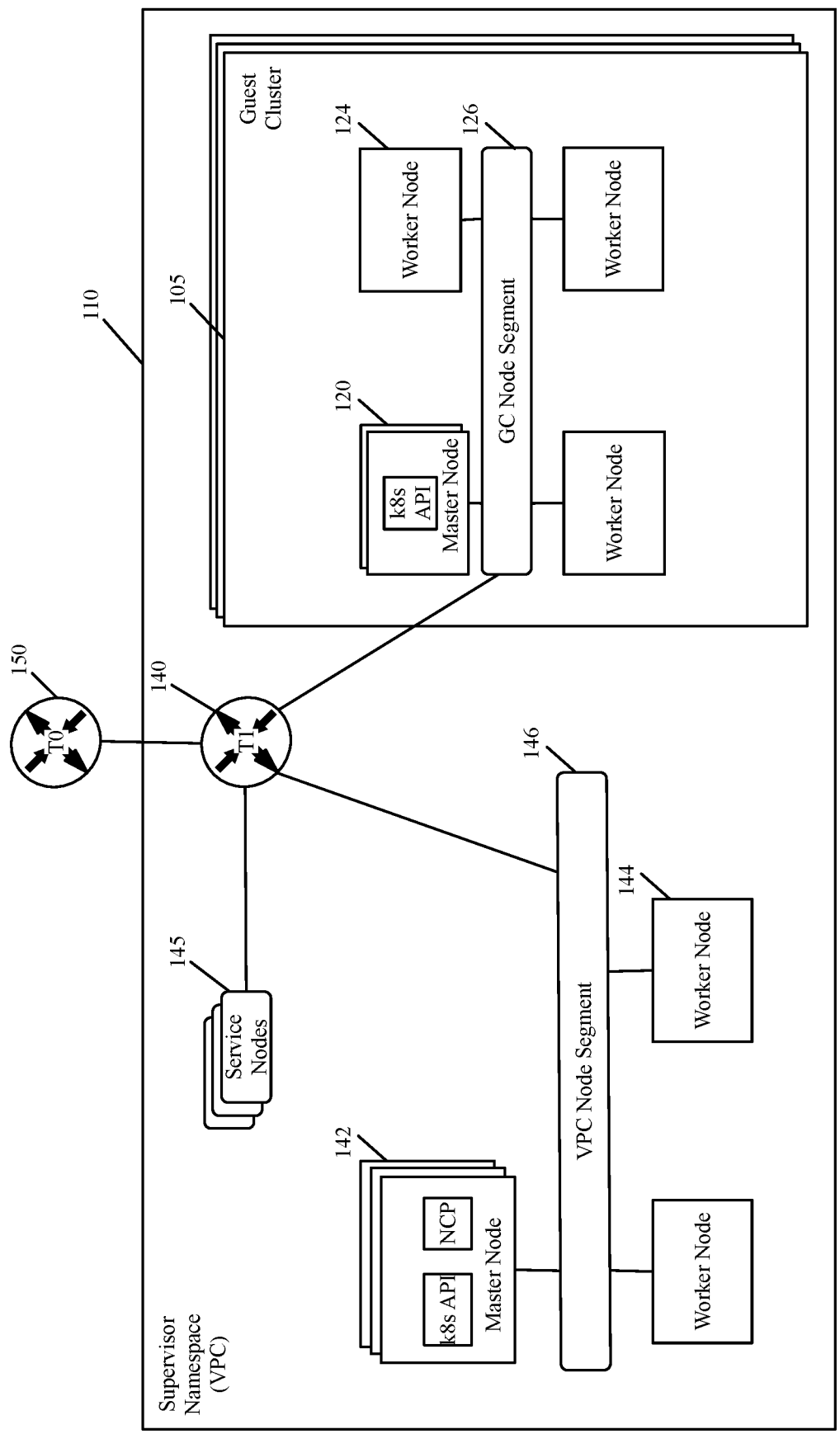
FIG. 1 illustrates an exemplary VPC configured to include a set of GCs that each use a set of service nodes that provide a set of services for machines of the VPC and the set of GCs.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel network architecture for deploying guest clusters (GCs) including workload machines for a tenant (or other entity) within an availability zone (e.g., a datacenter or set of datacenters providing a set of hardware resources). The novel network architecture includes a virtual private cloud (VPC) deployed in the availability zone (AZ) that includes a centralized VPC gateway router that provides access to an AZ gateway router, or set of gateway routing elements, of the AZ. In some embodiments, the centralized VPC gateway router provides a set of services for packets traversing a boundary of the VPC. The services, in some embodiments, include load balancing, firewall, quality of service (QoS) and may be stateful or stateless. Guest clusters are deployed within the VPC and use the centralized VPC gateway router of the VPC to access the AZ gateway router. The deployed GCs, in some embodiments, include distributed routing elements that (1) provide access to the centralized VPC router for components of the GC and (2) execute on host computers along with workload machines of the GC.

In some embodiments, automated processes are performed to define the virtual private cloud (VPC) connecting a set of machines to a logical network that segregates the set of machines from other machines in the AZ. In some embodiments, the set of machines include virtual machines and container Pods, the VPC is defined with a supervisor cluster namespace, and the API requests are provided as YAML files. In some embodiments, the Pods (container Pods) are hosted in lightweight VMs that in turn execute on a host computer. In other embodiments, the host computers (e.g., worker/master nodes) are lightweight VMs deployed to host Pods of the cluster or other cluster components.

The automated processes in some embodiments use templates or preconfigured rules to identify and deploy network elements (e.g., forwarding elements) that implement the logical network without an administrator performing any action to direct the identification and deployment of the network elements after an API request is received. In some embodiments, the deployed network elements include a gateway router for the VPC (called VPC gateway router) to connect the VPC to a network of the AZ and/or to a network external to the datacenter set.

The VPC gateway router in some embodiments is implemented by one physical router. In other embodiments, the VPC gateway router is a logical gateway router that is implemented by more than one physical router. For instance, in some embodiments, the logical router is implemented with two physical routers in active/active or active/standby configurations. Also, in some embodiments, the logical router includes (1) a distributed router that is implemented by several router instances on host computers and edge appliances, and (2) a service router that is implemented by one or more service router instances executing on an edge appliance. In some embodiments, the service router is only implemented by the edge appliances and not on the other host computers of the VPC.

In some embodiments, the service router provides routing operations and a set of stateful services, while the distributed router provides stateless routing and, in some embodiments, stateless services. In some embodiments, the edge appliances implementing the service router are configured in active/active or active/standby configurations. Active/active configurations, in some embodiments, include configurations in which the edge appliances are in an active/standby configuration for each of multiple GCs within the VPC, but each physical router is assigned to be an active service router that executes a service router instance that is assigned to be the active service router for at least one GC of the multiple GCs within the VPC while being a standby for a set of other GCs in the VPC. Because the service router is only implemented on a set of edge appliances and, in some embodiments, only a single service router instance is active for a given GC, the VPC gateway router is sometimes referred to as a centralized VPC gateway router.

The VPC gateway router is configured to communicate with a datacenter gateway router to connect to external networks (e.g., other VPCs, or network accessible over the Internet). In some embodiments, the VPC gateway router is configured to perform source network address translation (SNAT) operation to translate internal network addresses used within the VPC to a set of one or more external source network addresses. In some embodiments, the VPC gateway router does not perform SNAT operations for traffic exchanged between the VPC and another VPC that is deployed in the AZ, while in other embodiments it performs such SNAT operations.

The VPC gateway is configured to perform load balancing operations, or to work with one or more load balancers to perform load balancing operations, on ingress and/or egress traffic entering and/or exiting the VPC. The load balancing operations in some embodiments are Layer 4 (L4) and/or Layer 7 (L7) load balancing operations. In some embodiments, at least a subset of the deployed machines is deployed through Kubernetes, and the L4/L7 load balancing operations implement the load balancing and ingress services of Kubernetes.

To deploy the network elements, the method of some embodiments uses one or more Custom Resource Definitions (CRDs) to define attributes of custom-specified network resources that are referred to by the received API requests. When these API requests are Kubernetes APIs, the CRDs define extensions to the Kubernetes networking requirements. To deploy the network elements, the network control system of some embodiments processes one or more CRDs that define attributes of custom-specified network resources that are referred to by the received API requests. When these API requests are Kubernetes API requests, the CRDs define extensions to the Kubernetes networking requirements. Some embodiments use the following CRDs: Virtual Network Interfaces (VIF) CRDs, Virtual Network CRDs, Endpoint Group CRDs, security CRDs, Virtual Service Object (VSO) CRDs, and Load Balancer CRD.

A VIF CRD in some embodiments is used to define a virtual interface to connect a non-Kubernetes container Pod or VM to software forwarding elements (e.g., software switches) executing on host computers on which the non-Kubernetes Pods and VMs execute. A Virtual Network CRD in some embodiments is used to define the attributes of a logical sub-network that is to connect a subset of the deployed machines. An Endpoint Group CRD is used to define attributes for grouping heterogeneous or homogeneous sets of machines (i.e., machines of the same or different types). Endpoint Group CRD provides a simple mechanism for defining a group of machines for accessing a service or compute operation, and/or for providing a service or compute operation.

Security CRDs are used to specify security policies for the VPC. For instance, some embodiments use Security Policy CRD to define security policies for traffic between VPC network endpoints, which can be defined with Endpoint Group CRDs. Another security CRD in some embodiments is an Admin Policy CRD, which can be used to define security policies for north/south traffic between the VPC and an external network (e.g., from another VPC, from an external IP block, or from outside of the datacenter set in which the VPC is deployed).

A VSO CRD is used to expose a service (e.g., a middlebox service or an application tier, such as Web server, AppServer, database server) provided inside of the VPC to machines outside of the VPC or to machines inside of the VPC. In some embodiments, an API that refers to a VSO CRD map a set of one or more L4 ports and a protocol to an endpoint group of machines for providing the service. Some embodiments use a Load Balancer CRD to define the configuration for a load balancer service. In some embodiments, the API that refers to the VSO CRD also uses the Load Balancer CRD to specify a load balancer service to use for distributing the traffic load among the endpoint group of machines.

Several more detailed examples of some embodiments will now be described. In these examples, several of the deployed logical networks are Kubernetes-based logical networks that define virtual private clouds (VPC) for corporate entities in one or more datacenters. In some embodiments, the VPC is a "supervisor" Kubernetes cluster with a namespace that provides the tenancy boundary for the entity. These embodiments use CRDs to define additional networking constructs and policies that complement the Kubernetes native resources.

In some embodiments, the APIs define a cluster of nodes (e.g., a Kubernetes worker node cluster) that includes a set of components that represent a control plane for the cluster and a set of (worker) nodes. In some embodiments, the nodes are host computers that host components of the Kubernetes clusters. The host computers of the cluster, in some embodiments, are physical machines, virtual machines, or a combination of both. The host computers (i.e., nodes) execute a set of Pods that, in some embodiments, include a set of containers. In some embodiments, a Kubernetes worker node executes an agent that ensures that containers are running within Pods (e.g., a kubelet), a container runtime that is responsible for running containers, and a network proxy (e.g., a kube-proxy). A cluster, in some embodiments, is partitioned into a set of namespaces into which different Pods or containers are deployed. A namespace is further partitioned into separate clusters, in some embodiments, as will be described below.

One of ordinary skill will realize that other embodiments define other types of networks for other types of entities, such as other business entities, non-profit organizations, educational entities, etc. In some of these other embodiments, neither Kubernetes nor Kubernetes-based Pods are used. For instance, some embodiments are used to deploy networks for only VMs and/or non-Kubernetes containers/Pods. Additional details of VPC and GC deployment using CRDs can be found in U.S. patent application Ser. No. 16/897,652 filed on Jun. 10, 2020, now published as U.S. Patent Publication 2021/0314239, which is hereby incorporated by reference.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Some embodiments configure the logical network for the VPC to connect the deployed set of machines to each other. For instance, in some embodiments, the logical network includes one or more logical forwarding elements, such as logical switches, routers, gateways, etc. In some embodiments, a logical forwarding element (LFE) is defined by configuring several physical forwarding elements (PFEs), some or all of which execute on host computers along with the deployed machines (e.g., VMs and Pods). The PFEs, in some embodiments, are configured to implement two or more LFEs to connect two or more different subsets of deployed machines.

In some embodiments, two or more sub-networks are configured for the logical networks. In some embodiments, each sub-network has one or more segments (with each segment implemented by a logical switch), connects a different subset of deployed machines, and provides a set of network elements that satisfy a unique set of connectivity requirements for that subset of machines. For instance, in some embodiments, a first sub-network (e.g., a first logical switch) connects the Kubernetes Pods, while a second sub-network (e.g., a second logical switch) connects VMs and/or non-Kubernetes Pods. Another example is having one sub-network for machines (e.g., VMs, Pods, etc.) that need high-bandwidth, and another sub-network for machines that can tolerate less bandwidth.

To deploy some or all of the unique sub-networks, some embodiments use CRDs to define the attributes of the sub-networks, so that these sub-networks can be referred to by the API requests. These CRDs are referred to, in some embodiments, as virtual network CRDs. An API that refers to a virtual-network CRD in some embodiments includes a network type value that can be used to define different types of virtual networks.

FIG. 1 illustrates an exemplary virtual private cloud (VPC) 110 (e.g., a virtual hybrid cloud) configured to include a set of guest clusters (GCs) 105 that each use a set of service nodes 145 (e.g., VMs, appliances, containers, etc.) that provide a set of services for machines (master node 142 and worker nodes 144) of the VPC and the set of GCs. The nodes of the VPC, in some embodiments, are connected by a VPC node segment 146. Like different VPCs that can be defined for the same entity or different entities (different tenants) in an availability zone, different guest clusters can be defined for a VPC. The different guest clusters in some embodiments include different types of workloads (e.g., compute nodes, containers, etc.).

As shown, the set of guest clusters 105 includes several Kubernetes nodes (e.g., host computers that are part of the guest cluster) on which Pods (not shown) for the cluster execute. The set of nodes includes a set of master nodes 120 and a set of worker nodes 124. In some embodiments, the set of master nodes 120 includes a Kubernetes API server executing on each master node 120 to deploy Pods in the guest cluster. In this example, each guest cluster 105 includes a logical network (i.e., GC node segment 126) for connecting the Kubernetes nodes. In some embodiments, the logical network includes multiple network segments defined by a logical switch. The logical network of each guest cluster 105 connects to the logical VPC gateway router 140 that connects to the logical (or physical) gateway router 150 of the availability zone.

Figure 12:
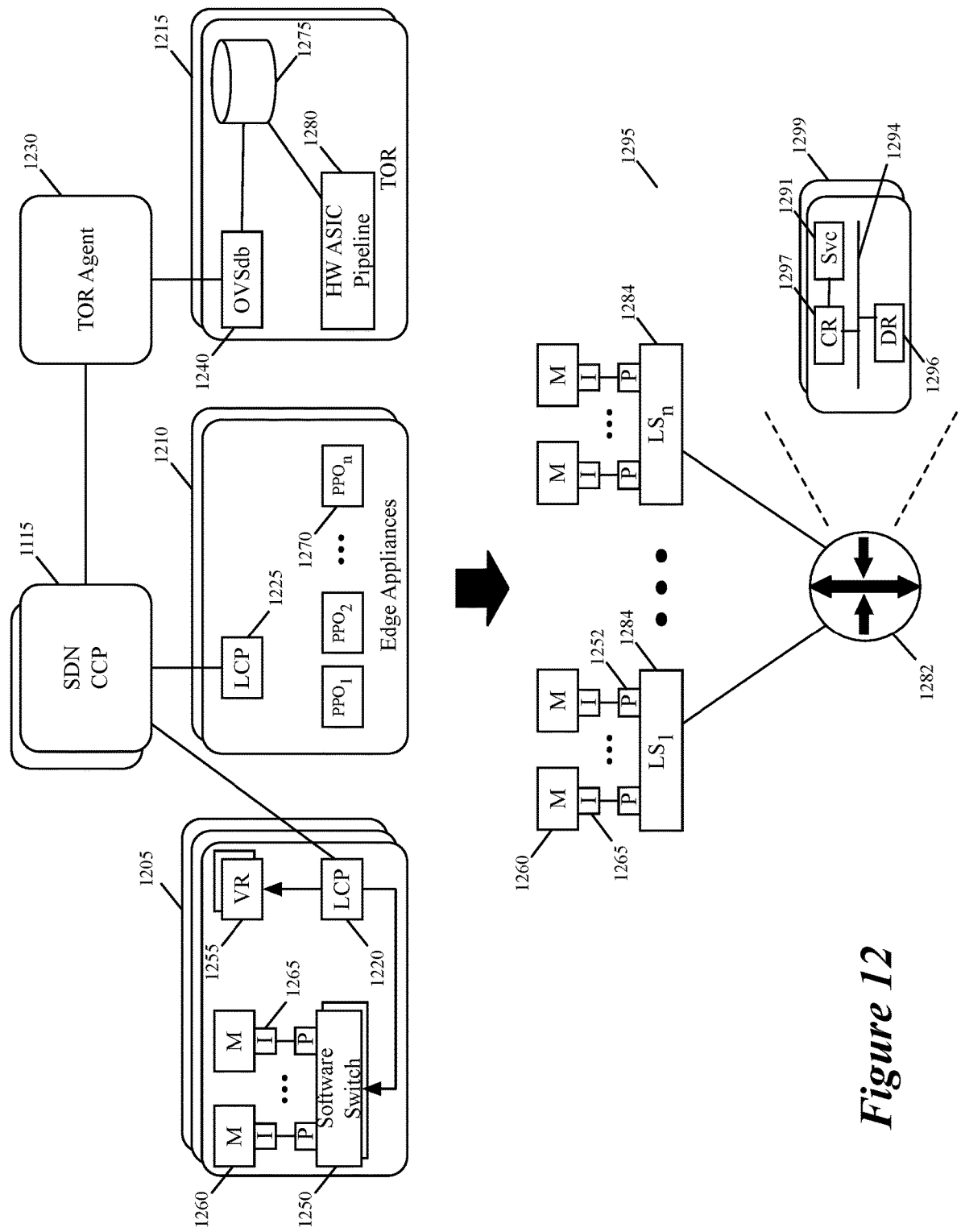
FIG. 12 illustrates an example of a logical network that defines a VPC for one entity, such as one corporation in a multi-tenant public datacenter, or one department of one corporation in a private datacenter.

In some embodiments, the logical VPC gateway router 140 of the VPC 110 is similar to the gateway router 1282 of FIG. 12 discussed below. As such, it includes distributed and centralized (service) routing components, with at least two redundant pairs of centralized routing components. In some embodiments, the nodes (e.g., host computers) executing machines of each guest cluster 105 implement the distributed router of logical VPC gateway router 140. The VPC 110 includes a logical network with one or more logical sub-networks each of which has one or more network segments with each network segment defined by a logical switch. In some embodiments, the GC logical network is a sub-network of the VPC logical network.

The networks and machines (e.g., VMs, Pods, etc.) of the GC, in some embodiments, use NSX-T native networking. In such embodiments, Pods are placed on NSX-T segments in the GC network. NSX-T container network interfaces (CNIs) are used, in such embodiments, to connect the Pods to the NSX-T native network. In the NSX-T native network, the machines (e.g., Pods and VMs) of the GCs can reach each other through NSX-T distributed switching and routing and GC machines can reach the machines of the VPC network through the NSX-T distributed switching and routing and, in some embodiments, through the centralized routing element of the VPC. GC subnets, in some embodiments, are not exposed outside the VPC. In some embodiments, all traffic forwarding, networking, and security services are implemented by an NSX-T dataplane in hypervisors of host computers hosting machines of the VPC and GC. The Kubernetes network policy, in some embodiments, is implemented by the NSX-T distributed firewall.

Figure 2:
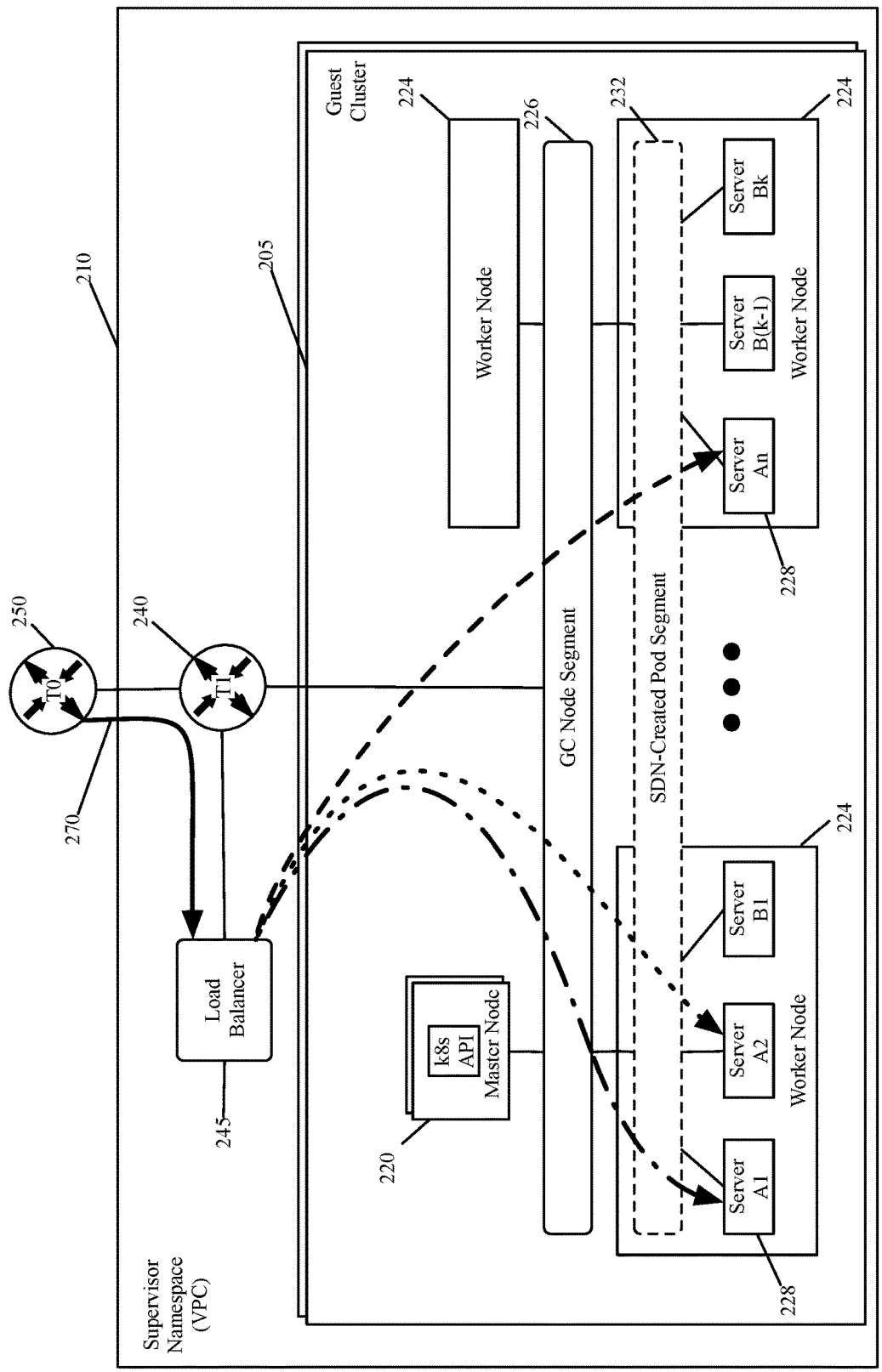
FIG. 2 illustrates a guest cluster using NSX-T CNIs to connect service Pods for a service executing in a set of worker nodes to an NSX-T service Pod segment.

FIG. 2 illustrates a guest cluster using NSX-T CNIs to connect service Pods 228 for a service executing in a set of worker nodes 224 to a network segment (SDN-created Pod segment 232) either known to, or created by, an SDN manager. The SDN-created Pod segment 232 and the network addresses of the service Pods on the segment 232 are known to the SDN manager cluster (e.g., an NSX-T management cluster) and allows individual Pods to be directly addressed by a VPC load balancer 245. Accordingly, FIG. 2 illustrates that packets of a set of packet flows 270 destined for the load balanced Pods (e.g., servers A) are processed by a load balancer (e.g., a service node) 245 of the VPC and with different subsets of packet flows (illustrated using different line styles) in the set of packet flow 270 distributed among any of the Pods 228 (i.e., Serves A1-An) using logical routing and forwarding operations that, in some embodiments, includes logical processing through the VPC T1 router 240, the GC node segment 226, and the SDN-created Pod segment 232.

Figure 3:
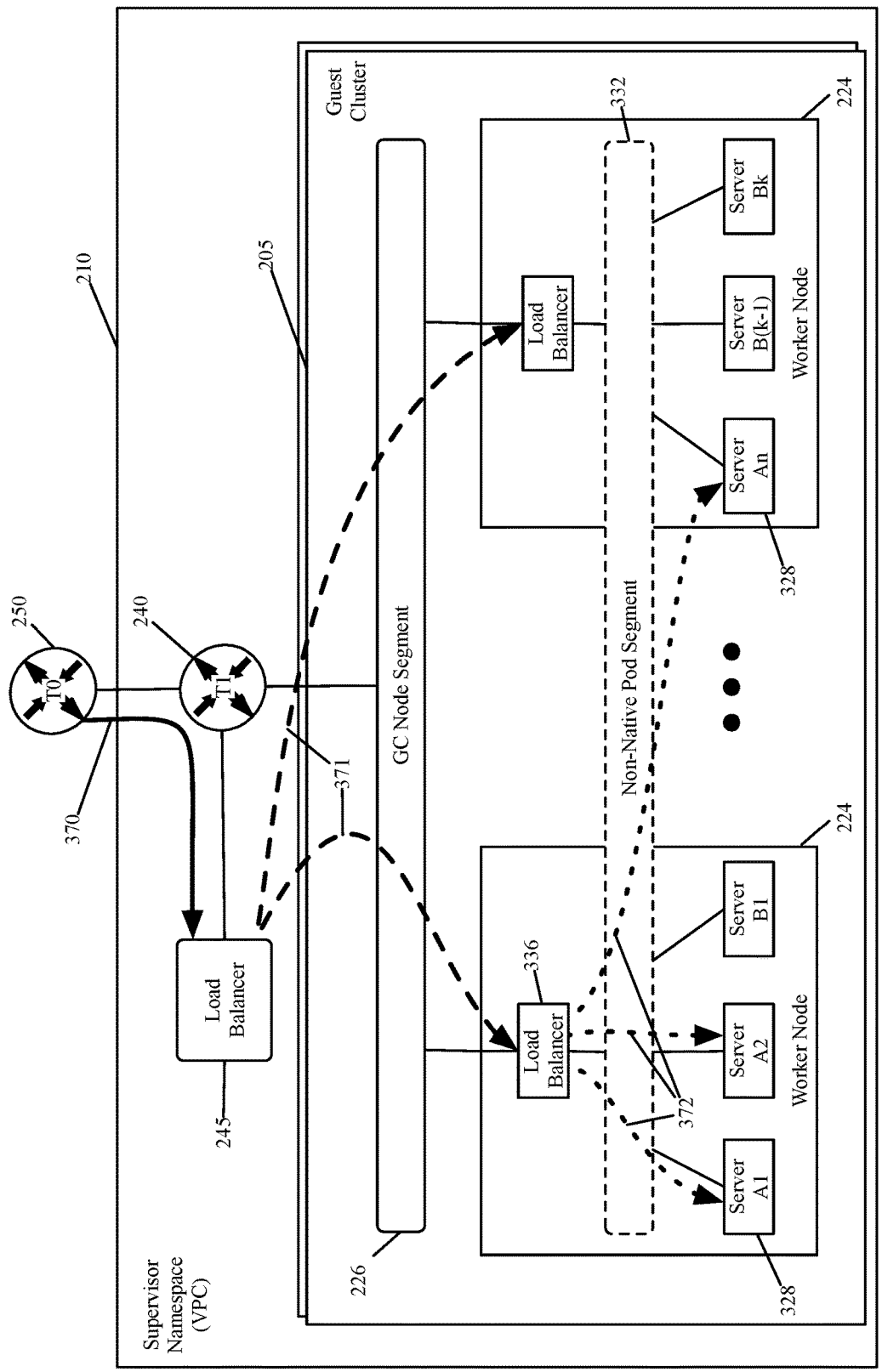
FIG. 3 illustrates a guest cluster using non-NSX-T CNIs to connect service Pods for a service executing in a set of worker nodes to a non-NSX-T service Pod segment.

In some embodiments, non-NSX-T CNIs are used to connect Pods over a virtual network implemented inside a set of worker nodes on which the service Pods (e.g., servers A1-n 328) execute, the virtual network (e.g., non-native Pod segment 332) will not be known to NSX-T. FIG. 3 illustrates a guest cluster using such non-NSX-T CNIs. Because the virtual network connecting the Pods (and the network addresses of the Pods on the virtual network) is unknown, some embodiments that populate the load balancer with information regarding load balanced instances by the SDN manager cluster (e.g., NSX-T network manager) identify worker nodes 224 (e.g., by using network addresses of the worker nodes) hosting service Pods 328 as the load-balanced service instances. However, because different worker nodes 224, in some embodiments, host different numbers of service Pods for a particular service, the load balancing over worker nodes does not spread the traffic evenly (or with any other desired distribution function). Accordingly, the supervisor namespace (VPC) NCP, in some embodiments, configures the worker nodes 224 to implement load balancing at the worker nodes. In some embodiments, the VPC NCP configures worker nodes to implement the load by balancing using service iptables created, in some embodiments, by a kube-proxy in the worker node to forward the traffic to a particular backend Pod.

The service iptables, or any other configured forwarding/load balancing component, is represented by load balancer 336. Load balancer 336, in some embodiments, is effectively a distributed load balancer that applies the same rules at each instance of the load balancer 336. In other embodiments, different load balancers 336 executing in different worker nodes 224 are programmed with different policies or rules for load balancing. A set of packet flows 370 destined for the load balanced Pods (e.g., servers A) are processed by a load balancer (e.g., a service node) 245 of the VPC which performs a first load balancing operation to produce subsets of the packet flows 371 that are directed to the individual worker nodes (e.g., using the IP address of the worker node on the GC node segment 226). Once the packets arrive at the worker nodes, the load balancer 336 (e.g., service iptables) performs a second load balancing operation to distribute the subset of packets received from the load balancer 245 among the individual service Pods 328 (e.g., as groups of packets 372) based on their network addresses on the non-native Pod segment 332 that are known to the worker nodes. A load balancing operation performed by one load balancer 336 is shown for clarity, however, one of ordinary skill in the art will appreciate that each load balancer performs a similar load balancing operation.

In some embodiments, a set of service nodes (e.g., service nodes 145 (e.g., VMs, appliances, containers, etc.)) are a resource shared by the VPC and the GCs within the VPC. In some embodiments, the service nodes are instances of virtual service objects (VSOs) that provide a set of services to the machines of the VPC and are inherited by GCs deployed in the VPC such that the machines of the GCs also receive the set of services from the service nodes 145. In some embodiments, the VSOs are associated with endpoint groups for which they provide a service. Different service nodes are deployed or assigned, in some embodiments, to provide a service or set of services for a particular GC within the VPC. Details of deploying a VSO can be found in U.S. patent application Ser. No. 16/897,652 filed on Jun. 10, 2020. In addition to inheriting the physical resources allocated to the VPC, in some embodiments, the guest clusters also inherit network policies and service definitions.

Figure 11:
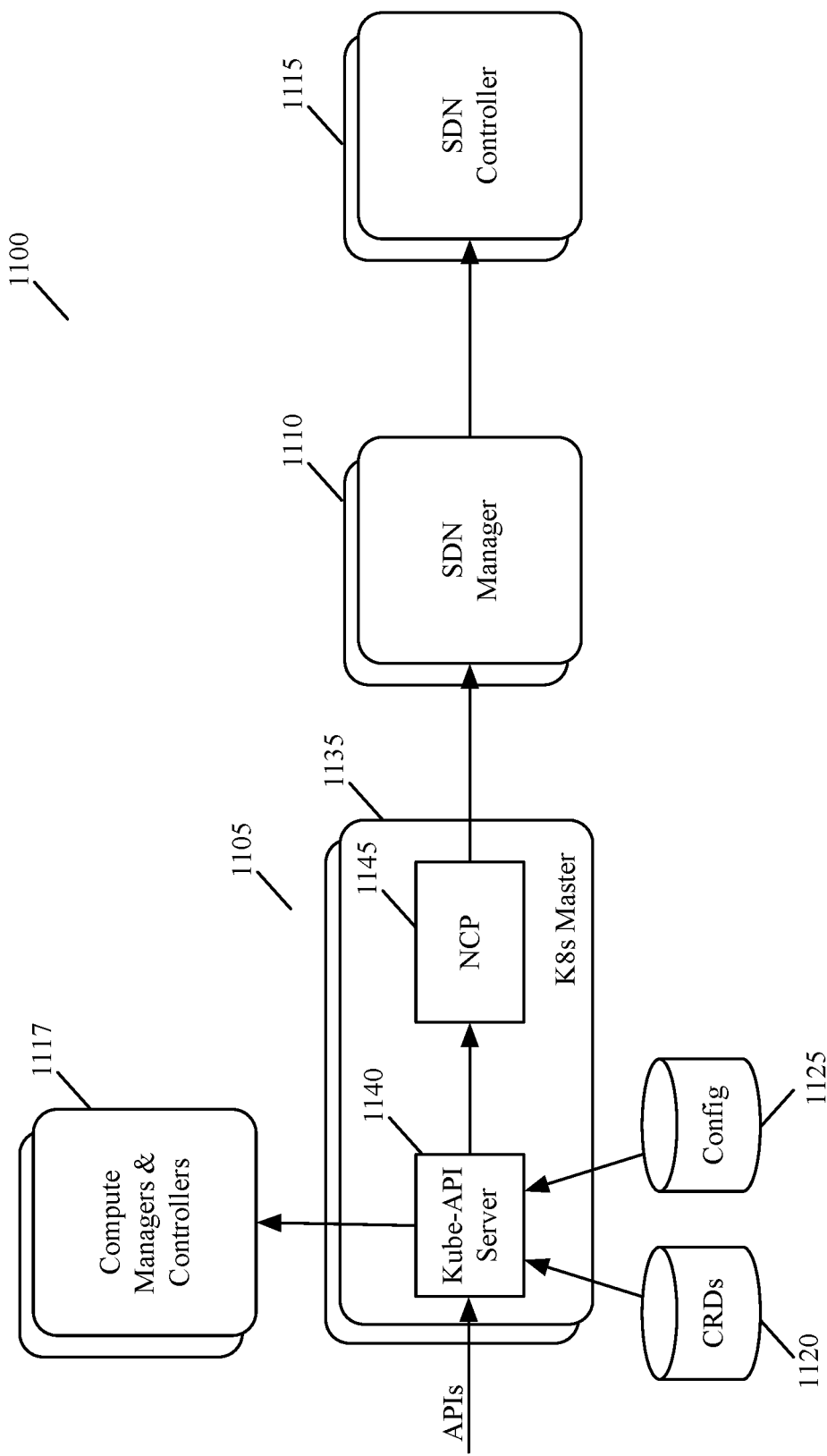
FIG. 11 illustrates an example of a control system of some embodiments of the invention.

The VPC 110 also includes a cluster of master nodes 142, each of which is similar to the Kubernetes master node 1135 of FIG. 11. Referring to elements of FIG. 9, in some embodiments, a master node 142 connects through one of its VNICs to a management network 960 to communicate with a set of SDN managers 962, which in turn communicates with a set of SDN controllers 964. The SDN managers/controllers are for deploying and configuring forwarding and service elements for the VPC. Compute elements (e.g., VMs and non-Kubernetes Pods) are deployed through compute managers/controllers 966. The NCP for a guest cluster, in some embodiments, creates a port for each pod on an NSX-T segment (i.e., a segment of the GC that uses NSX-T native networking) and reports all Kubernetes contexts (Namespace, Pod name, Namespace labels, Pod labels, Services) of the Pod to a management cluster of NSX-T. From NSX-T API/UI, any NSX-T feature could be enabled and Pod traffic statistics could be viewed on the segment port. More importantly an NSX-T administrator can create dynamic NSGroups (e.g., namespace group) or endpoint groups using the Kubernetes contexts and define security policies between NSGroups (or endpoint groups), and apply other services (IPFix, service insertion, etc.) to the NSGroup. The Kubernetes abstractions and contexts are also exposed to NSX-T Intelligence and Ops UI/API, which provide powerful networking visibility, troubleshooting, and analytic functionalities.

Figure 4:
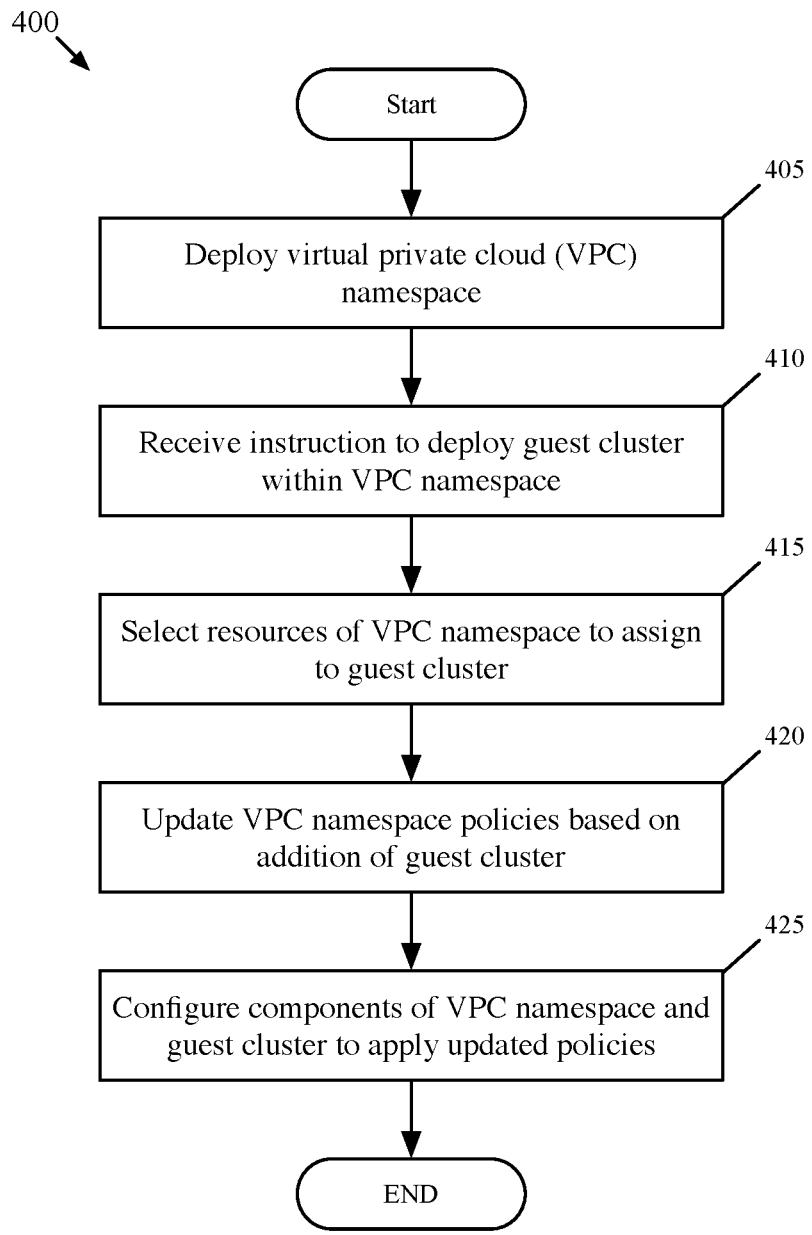
FIG. 4 conceptually illustrates a process for deploying a guest cluster in a virtual private cloud namespace.

FIG. 4 conceptually illustrates a process 400 for deploying a guest cluster in a virtual private cloud (VPC) namespace. In some embodiments, the process 400 is performed by a network management system including a compute manager/controller (e.g., compute manager/controller 966), a software defined network controller (e.g., SDN controller 964), and a software defined network manager (e.g., SDN manager 962). The process 400 begins by deploying (at 405) a VPC namespace (e.g., a namespace mapped to a virtual private cloud or a virtual hybrid cloud) in which NSX-T objects will be created. Deploying the VPC, includes deploying at least one centralized routing element (e.g., a VPC gateway router) that provides access to a gateway routing element of an availability zone (e.g., a datacenter gateway router). In some embodiments, each centralized routing element includes a centralized service routing element (e.g., a service router) that is implemented at a limited number of centralized gateway routing elements and a distributed routing component that is implemented at each centralized routing element and additional forwarding elements on host computers hosting machines of the VPC (or a guest cluster within the VPC as discussed below).

The centralized service routing component, in some embodiments, provides stateful services (e.g., firewall, load balancing, quality of service (QoS), etc.) and is implemented in an active/standby or active/active configuration that ensures that each data message belonging to a particular data message flow is always processed by a same centralized service routing component (service router) instance that stores the state for the particular data message flow. In some embodiments, the centralized service routing component connects to service machines (e.g., service nodes 145) that provide a stateful service and directs data messages that require the service (e.g., based on network policies specified for the VPC) to the service machines. The distributed routing component of the VPC, in some embodiments, performs a set of stateless routing operations. The set of stateless routing operations performed by the distributed routing component, in some embodiments, includes a distributed firewall operation that applies stateless firewall rules to data messages processed by the distributed routing element. The distributed routing element, in some embodiments, executes (is implemented) on each host computer that hosts a machine of the VPC namespace including any guest clusters within the VPC namespace. The firewall rules in some embodiments are defined by a security CRD as described above and in more detail in U.S. patent application Ser. No. 16/897,652.

After deploying the namespace, the process 400 receives (at 410) an instruction to deploy a guest cluster (e.g., guest cluster 105) within the VPC namespace (e.g., supervisor namespace 110). The instruction, in some embodiments, is received at a network manager cluster (e.g., SDN manager 962) from a network control system such as the one described below in relation to FIG. 11. In some embodiments, the instruction is received as an API request as described below. The API request, in some embodiments, is a portion of a hierarchical API request that included instructions to deploy the VPC namespace and then to deploy the guest cluster (or guest clusters) within the VPC namespace. The instruction to deploy the guest cluster, in some embodiments, includes instructions to deploy components of the guest cluster (e.g., network segments, service Pods, node virtual machines, other Pods, etc.) and to enable a set of services for the guest cluster such as a firewall or load balancer for the service Pods.

After the instruction to deploy the guest cluster is received (at 410) the process 400 selects (at 415) resources of the VPC namespace to assign to the guest cluster. The resources assigned to the guest cluster, in some embodiments, include all or some of IP addresses, service machines, physical compute resources, network (e.g., bandwidth) resources, VPC gateway routing elements, etc. For example, in some embodiments, a particular centralized routing element is selected to be the active centralized routing element for a particular deployed guest cluster. Additionally, or alternatively, a particular set of load balancers or other service machines is selected, in some embodiments, to provide load balancing or other services to a particular deployed guest cluster. By selecting different centralized routing elements (e.g., VPC gateway routers) and sets of service machines for each guest cluster, the load from each guest cluster can be distributed among existing instances of the centralized routing elements and service machines without having to deploy a new centralized routing element and set of service machines each time a guest cluster is deployed.

Figure 5:
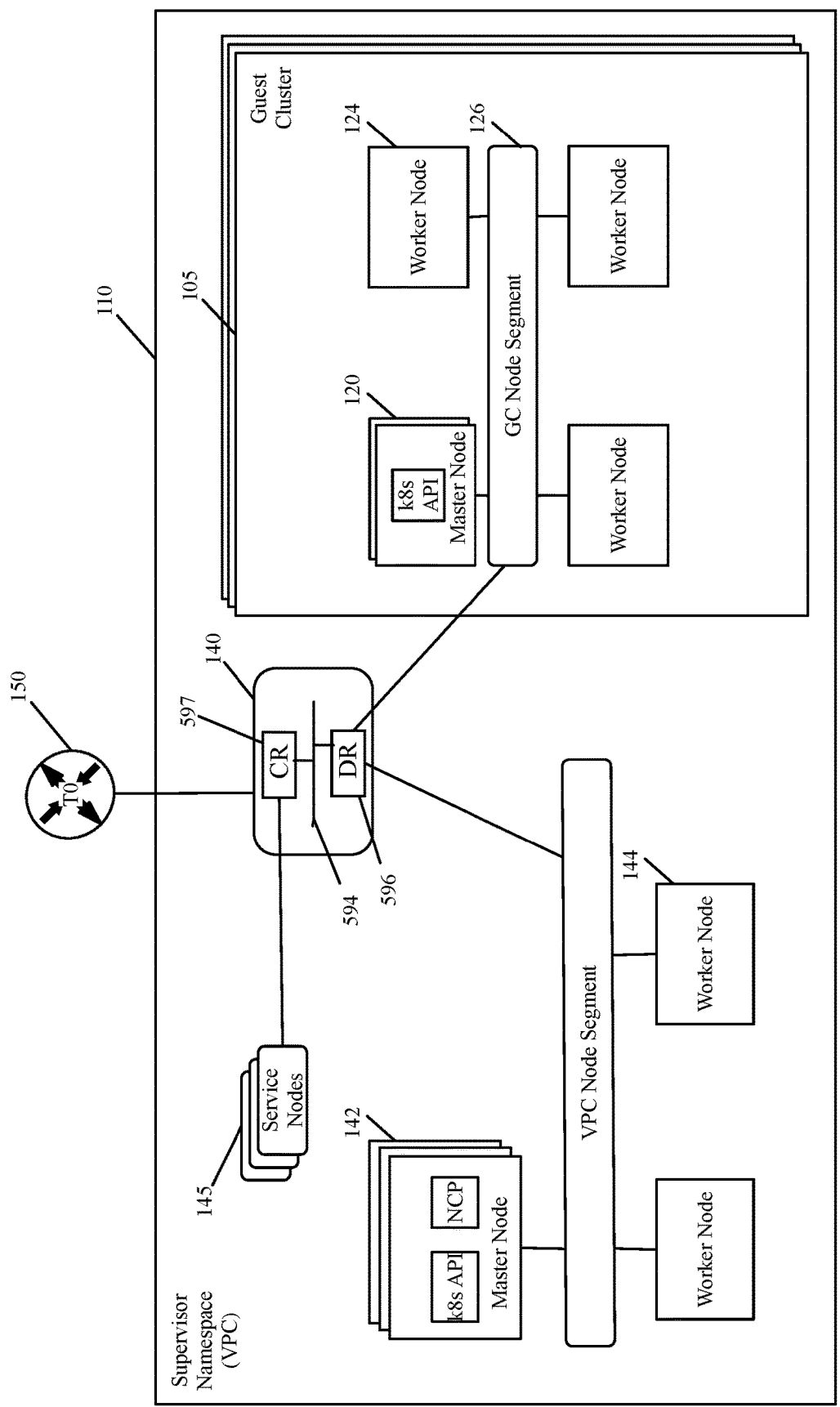
FIG. 5 illustrates a supervisor namespace including a set of guest clusters using a centralized routing element of the supervisor namespace.
Figure 6:
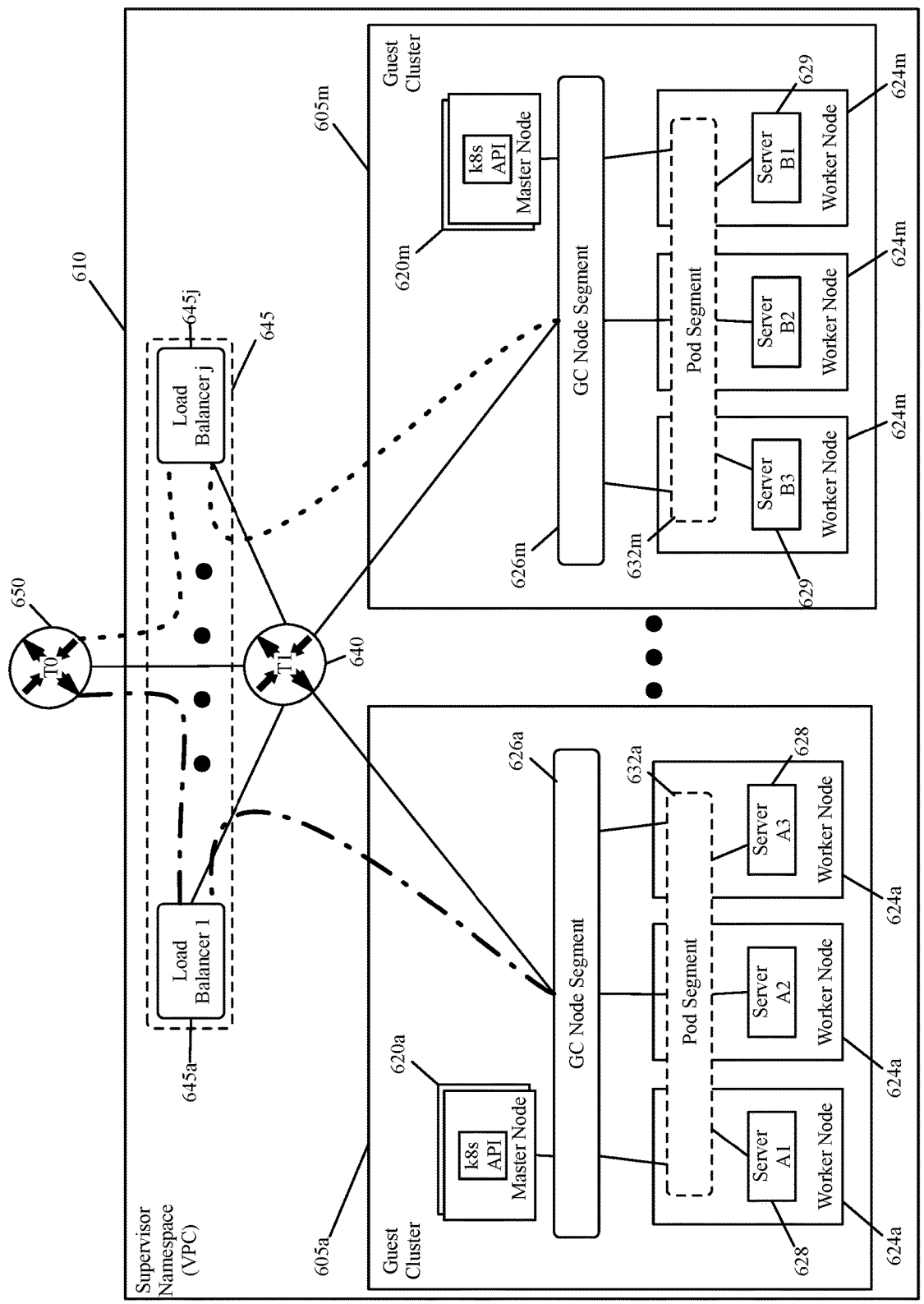
FIG. 6 illustrates a VPC that includes a set of guest clusters that are each assigned a particular service machine in a service machine cluster.
Figure 7:
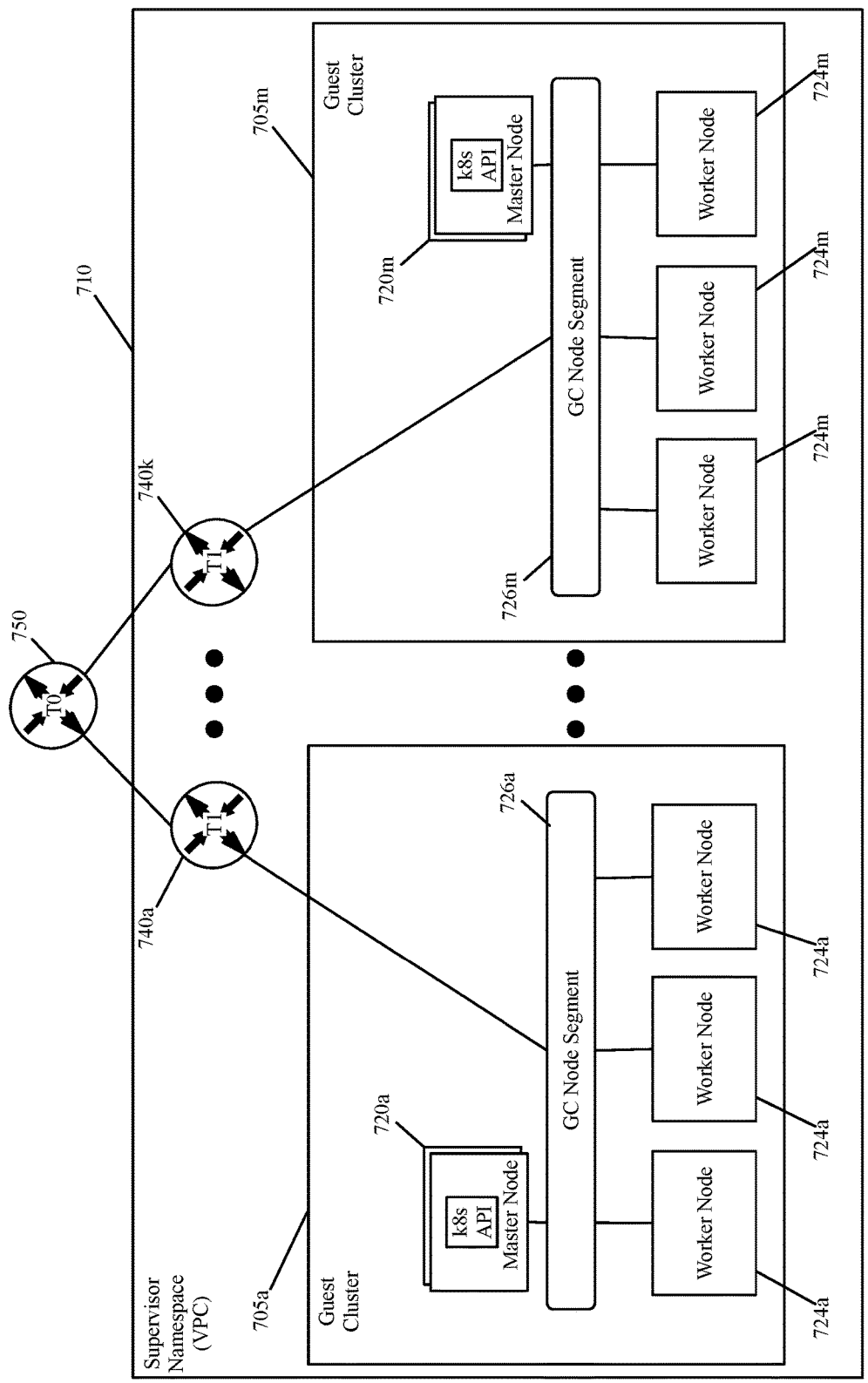
FIG. 7 illustrates a VPC that includes a set of multiple VPC gateway routers that are configured in active/standby configuration for each guest cluster such that the set of VPC gateway routers is effectively configured in an active/active configuration.

FIGS. 5-7 illustrate guest clusters using services of the VPC selected in operation 410. FIG. 5 illustrates a supervisor namespace 110 including a set of guest clusters 105. The guest clusters 105 include sets of worker nodes that host service Pods (not shown) that are serviced by service nodes 145 (e.g., load balancers, SNAT, Firewalls, etc.) of the VPC gateway router (centralized routing element). The guest clusters 105 each implement at least one instance of the distributed routing component 596 (e.g., one DR instance on each host computer hosting a machine of the guest cluster). The worker nodes (e.g., host computers), in some embodiments, also implement sets of logical switches (e.g., network segments) for different groups of machines (e.g., Pods, VMs, etc.) that connect to the DR component 596 executing in the same guest cluster which, in turn, connects to the logical switch 594 connecting the distributed routing component 596 of the VPC gateway router 140 to the centralized routing component 597 of the VPC gateway router 140. The guest clusters thus inherit north-south firewall rules that are applied at the centralized routing component of the VPC gateway router 140 and the distributed firewall applied at the DR 596.

FIG. 6 illustrates a VPC 610 that includes a set of guest clusters 605a-605m that are each assigned a particular service machine (e.g., load balancers 645a and 645j) in a service machine cluster 645. Machines in the VPC are not shown for clarity. Each guest cluster 605a-605m of FIG. 6 accesses availability zone gateway router 650 through VPC gateway router 640. Guest clusters 605a-605m connect to components of the other guest clusters and the VPC through the distributed router of the VPC. In some embodiments, each set of service Pods (e.g., 628) in a GC 605 has a particular load balancer 645 selected to load balance for the set of service Pods. In FIG. 6, load balancer 645a is selected for a set of service Pods (i.e., servers A1-A3 628) in guest cluster 605a and load balancer 645j is selected for a set of service Pods (i.e., servers B1-B3 629) in guest cluster 605m and a set of service nodes in the VPC. One of ordinary skill in the art will appreciate that, in some embodiments, a set of multiple service machines in the service machine cluster 645 is selected for at least one GC 605 and that different sets of service machines in the service machine cluster 645 are selected for different GCs 605. A service machine cluster for only one service (i.e., load balancing 645) is illustrated for clarity, but one of ordinary skill in the art will appreciate that multiple such service machine clusters may exist in some embodiments and that the selection of a particular service machine in each service machine cluster, in some embodiments, is independent of the selection of a particular service machine in a different service machine cluster.

FIG. 7 illustrates a VPC 710 that includes a set of multiple VPC gateway routers 740a-740k that are configured in active/standby configuration for each guest cluster 705a-705m such that the set of VPC gateway routers 740a-740k is effectively configured in an active/active configuration. VPC gateway router 740a is selected for guest cluster 705a and the VPC gateway router 740k is selected for guest cluster 705m. In some embodiments, each VPC gateway router 740 connects to a same set of service machines, while in other embodiments, each VPC gateway router connects to a different set of service machines. The set of service machines for each VPC gateway router, in some embodiments, is based on the services required for guest clusters for which the VPC gateway router have been selected.

Figure 8:
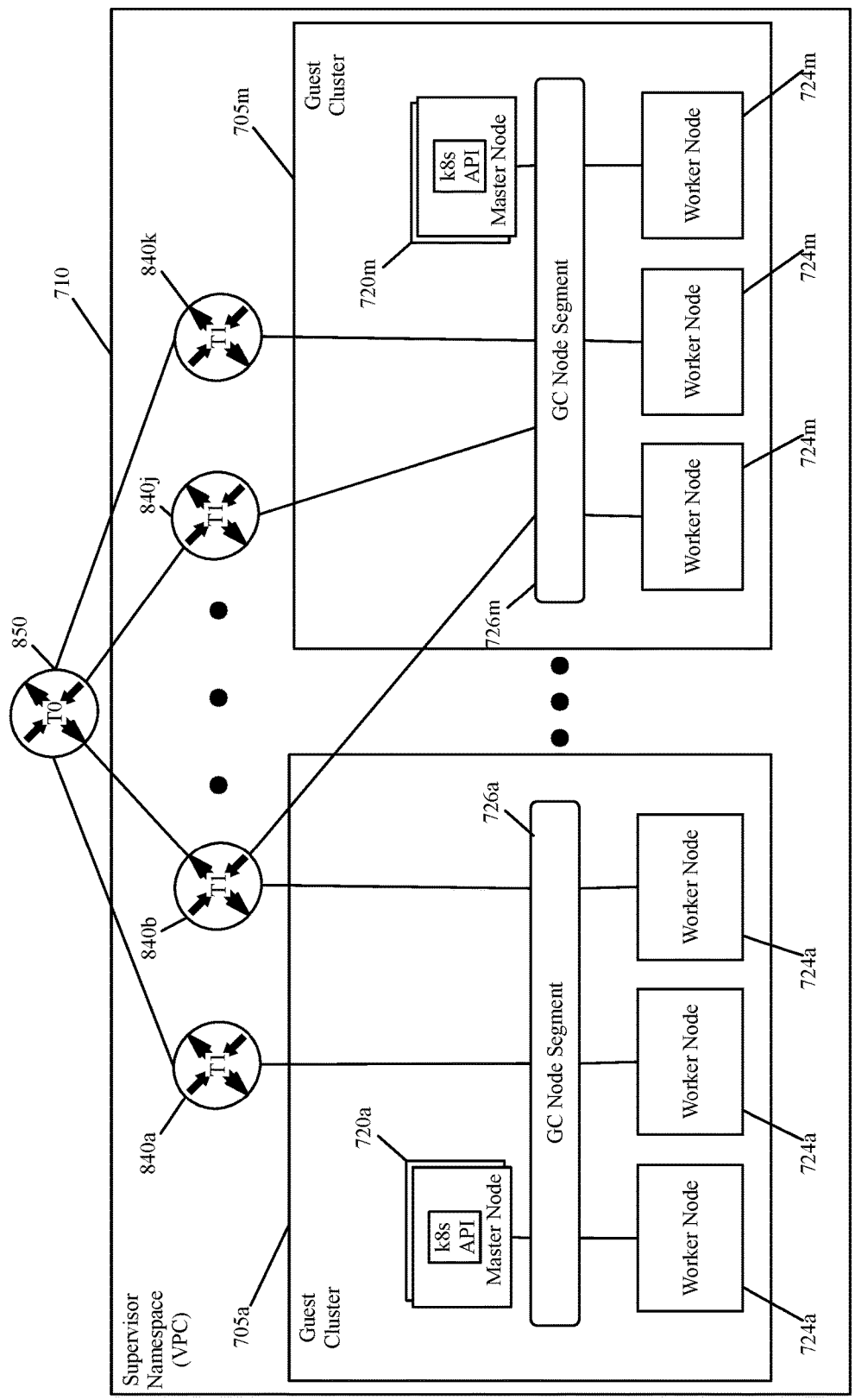
FIG. 8 illustrates a VPC that includes a set of multiple VPC gateway routers that perform gateway routing for a set of guest clusters and the VPC.

FIG. 8 illustrates a VPC 710 that includes a set of multiple VPC gateway routers 840a-840k that perform gateway routing for the set of guest clusters 705a-705m and the VPC 710. For each guest cluster 705 a set of VPC gateway routers 840 is selected and configured in active/active configuration. VPC gateway routers 840a and 840b are selected as the active/active gateway routers 840 for guest cluster 705a, and the VPC gateway routers 840b, 840j, and 840k are selected as the active/active gateway routers 840 for guest cluster 705m.

In some embodiments, gateway routers 840 configured as active/active gateway routers exchange any of (1) state information related to stateful services provided at the gateway routers 840 or (2) information allowing a particular gateway router (e.g., 840b) that receives a packet to identify the gateway router that maintains the state information needed to process the packet. For example, in some embodiments, a consistent hash of header values that are constant for the life of a packet flow are used to identify a (backup) gateway router that stores state information. In other embodiments, stateful services provided by a same service node called by each gateway router 840 for a particular guest cluster maintains the state information and the gateway routers do not have to account for the location of the state information. In some embodiments, each VPC gateway router 840 (or set of gateway routers) connects to a same set of service machines, while in other embodiments, each VPC gateway router connects to a different set of service machines. The set of service machines for each VPC gateway router, in some embodiments, is based on the services required for guest clusters for which the VPC gateway router have been selected.

In addition to selecting (at 415) resources of the VPC namespace to assign to the guest cluster, the process 400 updates (at 420) policies (e.g., security and network policies) of the VPC namespace based on the addition of the guest cluster. In some embodiments, updating the policies includes adding policies defined for the guest cluster to existing policies of the VPC namespace. For example, based on a set of service pods implemented in the guest cluster and assigned a virtual IP (VIP) address (e.g., by selecting an available VIP of the VPC namespace in operation 415), a network policy requiring load balancing for data messages destined to the VIP associated with the set of service pods is added to the set of existing network policies. In addition to updating a network policy, a firewall based on a security policy may need to be updated based on the addition of the guest cluster. For example, a firewall policy that generates firewall rules for each machine in the VPC based on a source and/or destination address of a data message updates the set of firewall rules with firewall rules for the addresses of the machines in the added guest cluster. If a firewall rule specifies a group of machines, some embodiments add the machines of the guest cluster to the group definition (e.g., either a machine identifier or a VIF of the machine at which the rule should be applied). For north-south firewall rules, new rules are added, in some embodiments, based on an external IP address used by the guest cluster (e.g., based on a source network address translation operation at the edge of the guest cluster or at the centralized routing element of the VPC).

Finally, the components of the VPC and the guest cluster(s) within the VPC namespace are configured (at 425) to apply the updated policies. In some embodiments, configuring the VPC components includes updating a rule set or group definition as described above. Configuring the guest clusters, in some embodiments, includes identifying the host computers hosting machines of the guest cluster and updating an existing distributed routing component instance to apply the updated rules and implement the network segments of the added guest cluster. Alternatively, in some embodiments, or for host computers that previously did not host components of the VPC, configuring components of the VPC to apply the updated policies includes configuring a forwarding element of a host computer on which a machine of the guest cluster executes to implement the network segments to which the guest cluster machines connect as well as the distributed routing component which applies a set of updated distributed firewall rules. Additional details of deploying VPC namespaces and guest clusters are discussed below.

Figure 9:
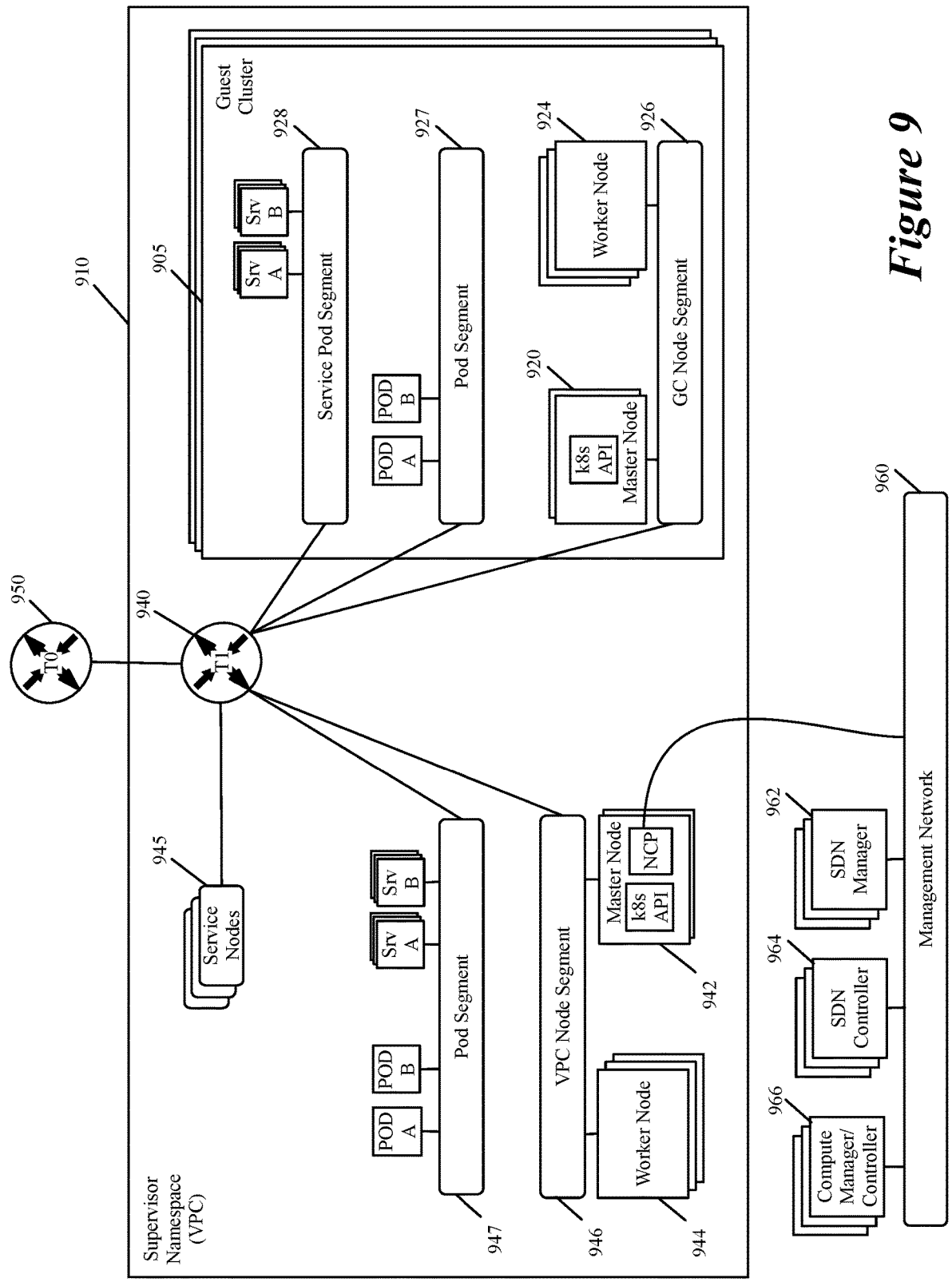
FIG. 9 illustrates a more complete logical view of the supervisor namespace (VPC) and guest clusters.

In some embodiments, the supervisor cluster (VPC) resources (e.g., network and Kubernetes services, Pods, VMs, worker nodes, etc.) are accessible by the guest cluster machines (e.g., VMs and Pods). This is because the IP addresses of the VPC machines are reachable from the machines of the guest clusters. In some embodiments, the guest cluster network is opaque to the supervisor cluster (VPC) such that the VPC machines cannot address the machines in the GC networks. FIG. 9 illustrates a more complete logical view of the supervisor namespace (VPC) 910 and guest clusters 905. The VPC 910 includes a logical VPC gateway router 940 and a set of service nodes 945 that provide edge services for VPC 910 and guest clusters 905. The logical gateway router 940, in some embodiments, is implemented by multiple physical routing elements as discussed above in relation to FIGS. 7 and 8 and service nodes 945 represent different sets of service nodes 945 that provide different services.

VPC 910 also includes multiple network segments (e.g., logical switches) 947 and 946 that may be scaled out (e.g., by an auto-scaling operation performed by an NCP of a master node 942) based on the availability of addresses in the network segment. In some embodiments, multiple different segments are deployed to logically separate machines (Pods, VMs, etc.) with different functions or that belong to different entities of a tenant for which the VPC 910 is deployed. Each network segment of the VPC 910 is logically connected to logical gateway router 940. The master node 942, in some embodiments, is connected to a management network to communicate with the compute manager/controller 966 to deploy machines and to communicate with the SDN manager 962 to identify machines in the VPC 910 (or guest cluster 905) network that need to be connected to the SDN network (e.g., an NSX-T network). The SDN manager 962 can communicate with the SDN controller 964 as described in more detail below in regard to FIG. 11.

Each guest cluster 905 includes at least one network segment that connects to the logical gateway router 940. As for the VPC network segments 946 and 947, the network segments of the guest cluster may be scaled out (e.g., by an auto-scaling operation performed by an NCP of a master node 942) based on the availability of addresses in the network segment. In some embodiments, multiple different segments are deployed to logically separate machines (Pods, VMs, etc.) with different functions or that belong to different entities of a tenant for which the guest cluster 905 is deployed.

Figure 10:
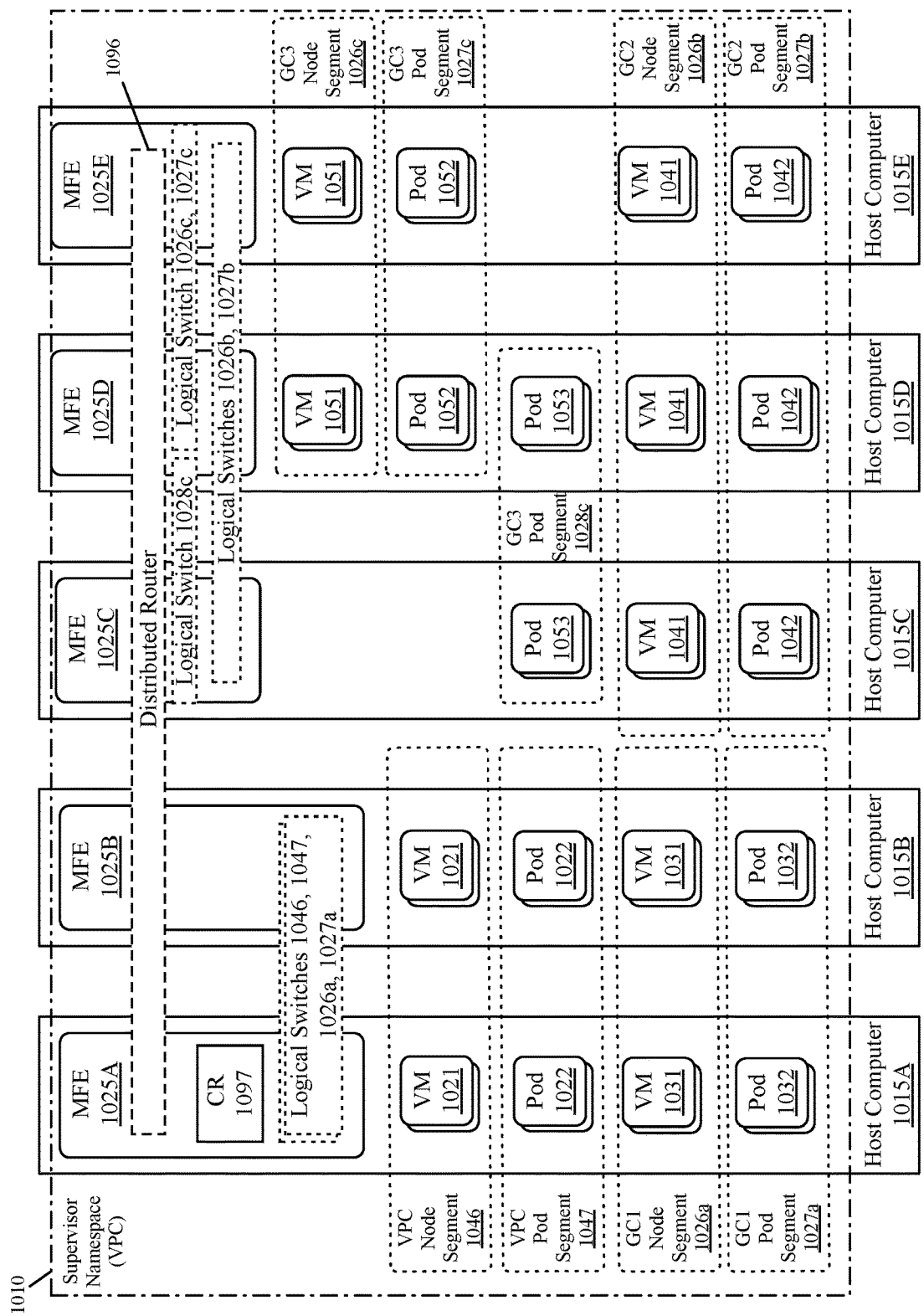
FIG. 10 illustrates a set of physical host computers on which machines of a VPC and machines of GC1-GC3 execute.

FIG. 10 illustrates a set of physical host computers 1015A-E on which machines (e.g., VMs 1021 and Pods 1022) of a VPC 1010 and machines (VMs 1031, 1041, and 1051 and Pods 1032, 1042, and 1052) of GC1-GC3 execute. The host computers 1015A-E each execute a managed forwarding element (MFE 1025A-E) that implement logical switches for logical networks (segments) that span the host computer and execute the distributed router 1096. The MFE 1025A is the only MFE that executes the centralized routing component in the illustrated embodiment. As can be seen, different sets of host computers 1015 execute machines (VMs and Pods) of different guest clusters (GC1-GC3) and of different segments (1046, 1047, 1026a-c, 1027a-c, and 1028c) of the guest clusters. One of ordinary skill in the art will understand that FIG. 10 is merely for illustrative purposes and that many more host computers with more complicated configurations are used in some embodiments. Additionally, although service nodes have been omitted from FIG. 10 they are understood to execute on a set of host computers or appliances and are omitted only for clarity.

FIG. 11 illustrates an example of a control system 1100 of some embodiments of the invention. This system 1100 processes APIs that use the Kubernetes-based declarative model to describe the desired state of (1) the machines to deploy, and (2) the connectivity, security and service operations that are to be performed for the deployed machines (e.g., private and public IP addresses connectivity, load balancing, security policies, etc.). To process these API, the control system 1100 uses one or more CRDs to define some of the resources referenced in the APIs. The system 1100 performs automated processes to deploy a logical network that connects the deployed machines and segregates these machines from other machines in the datacenter set. The machines are connected to the deployed logical network of a VPC in some embodiments.

As shown, the control system 1100 includes an API processing cluster 1105, a software defined network (SDN) manager cluster 1110, an SDN controller cluster 1115, and compute managers and controllers 1117. The API processing cluster 1105 includes two or more API processing nodes 1135, with each node comprising an API processing server 1140 and a network controller plugin (NCP) 1145. The API processing server receives intent-based API calls and parses these calls. In some embodiments, the received API calls are in a declarative, hierarchical Kubernetes format, and may contain multiple different requests.

The API processing server 1140 parses each received intent-based API request into one or more individual requests. When the requests relate to the deployment of machines, the API server provides these requests directly to compute managers and controllers 1117, or indirectly provide these requests to the compute managers and controllers 1117 through an agent running on the Kubernetes master node 1135. The compute managers and controllers 1117 then deploy VMs and/or Pods on host computers in the availability zone.

The API calls can also include requests that require network elements to be deployed. In some embodiments, these requests explicitly identify the network elements to deploy, while in other embodiments the requests can also implicitly identify these network elements by requesting the deployment of compute constructs (e.g., compute clusters, containers, etc.) for which network elements have to be defined by default. As further described below, the control system 1100 uses the NCP 1145 to identify the network elements that need to be deployed, and to direct the deployment of these network elements.

In some embodiments, the API calls refer to extended resources that are not defined per se by Kubernetes. For these references, the API processing server 1140 uses one or more CRDs 1120 to interpret the references in the API calls to the extended resources. As mentioned above, the CRDs in some embodiments include the VIF, Virtual Network, Endpoint Group, Security Policy, Admin Policy, and Load Balancer and VSO CRDs. In some embodiments, the CRDs are provided to the API processing server in one stream with the API calls.

NCP 1145 is the interface between the API server 1140 and the SDN manager cluster 1110 that manages the network elements that serve as the forwarding elements (e.g., switches, routers, bridges, etc.) and service elements (e.g., firewalls, load balancers, etc.) in an availability zone. The SDN manager cluster 1110 directs the SDN controller cluster 1115 to configure the network elements to implement the desired forwarding elements and/or service elements (e.g., logical forwarding elements and logical service elements) of one or more logical networks. As further described below, the SDN controller cluster interacts with local controllers on host computers and edge gateways to configure the network elements in some embodiments.

In some embodiments, NCP 1145 registers for event notifications with the API server 1140, e.g., sets up a long-pull session with the API server to receive all CRUD (Create, Read, Update and Delete) events for various CRDs that are defined for networking. In some embodiments, the API server 1140 is a Kubernetes master node, and the NCP 1145 runs in this node as a Pod. NCP 1145 in some embodiments collects realization data from the SDN resources for the CRDs and provide this realization data as it relates to the CRD status.

In some embodiments, NCP 1145 processes the parsed API requests relating to VIFs, virtual networks, load balancers, endpoint groups, security policies, and VSOs, to direct the SDN manager cluster 1110 to implement (1) the VIFs needed to connect VMs and Pods to forwarding elements on host computers, (2) virtual networks to implement different segments of a logical network of the VPC (or of GCs within the VPC), (3) load balancers to distribute the traffic load to endpoint machines, (4) firewalls to implement security and admin policies, and (5) exposed ports to access services provided by a set of machines in the VPC to machines outside and inside of the VPC.

The API server provides the CRDs that have been defined for these extended network constructs to the NCP for it to process the APIs that refer to the corresponding network constructs. The API server also provides configuration data from the configuration storage 1125 to the NCP 1145. The configuration data in some embodiments include parameters that adjust the pre-defined template rules that the NCP follows to perform its automated processes. The NCP performs these automated processes to execute the received API requests in order to direct the SDN manager cluster 1110 to deploy the network elements for the VPC. For a received API, the control system 1100 performs one or more automated processes to identify and deploy one or more network elements that are used to implement the logical network for a VPC. The control system performs these automated processes without an administrator performing any action to direct the identification and deployment of the network elements after an API request is received.

The SDN managers 1110 and controllers 1115 can be any SDN managers and controllers available today. In some embodiments, these managers and controllers are the NSX-T managers and controllers licensed by VMware Inc. In such embodiments, NCP 1145 detects network events by processing the data supplied by its corresponding API server 1140, and uses NSX-T APIs to direct the NSX-T manager 1110 to deploy and/or modify NSX-T network constructs needed to implement the network state expressed by the API calls. The communication between the NCP and NSX-T manager 1110 is asynchronous communication, in which NCP provides the desired state to NSX-T managers, which then relay the desired state to the NSX-T controllers to compute and disseminate the state asynchronously to the host computer, forwarding elements and service nodes in the availability zone (i.e., to the SDDC set controlled by the controllers 1115).

After receiving the APIs from the NCPs 1145, the SDN managers 1110 in some embodiments direct the SDN controllers 1115 to configure the network elements to implement the network state expressed by the API calls. In some embodiments, the SDN controllers serve as the central control plane (CCP) of the control system 1100. FIG. 12 depicts the SDN controllers 1115 acting as the CCP computing high level configuration data (e.g., port configuration, policies, forwarding tables, service tables, etc.). In such capacity, the SDN controllers 1115 push the high-level configuration data to the local control plane (LCP) agents 1220 on host computers 1205, LCP agents 1225 on edge appliances 1210 and TOR (top-of-rack) agents 1230 of TOR switches 1215.

Based on the received configuration data, the LCP agents 1220 on the host computers 1205 configure one or more software switches 1250 and software routers 1255 to implement distributed logical switches, routers, bridges and/or service nodes (e.g., service VMs or hypervisor service engines) of one or more logical networks with the corresponding switches and routers on other host computers 1205, edge appliances 1210, and TOR switches 1215. On the edge appliances, the LCP agents 1225 configure packet processing stages 1270 of these appliances to implement the logical switches, routers, bridges and/or service nodes of one or more logical networks along with the corresponding switches and routers on other host computers 1205, edge appliances 1210, and TOR switches 1215.

For the TORs 1215, the TOR agents 1230 configure one or more configuration tables 1275 of TOR switches 1215 through an OVSdb server 1240. The data in the configuration tables then is used to configure the hardware ASIC packet-processing pipelines 1280 to perform the desired forwarding operations to implement the desired logical switching, routing, bridging and service operations. U.S. Pat. Nos. 10,554,484, 10,250,553, 9,847,938, and 9,178,833 describe CCPs, LCPs and TOR agents in more detail, and are incorporated herein by reference.

After the host computers 1205 are configured along with the edge appliances 1210 and/or TOR switches 1215, they can implement one or more logical networks, with each logical network segregating the machines and network traffic of the entity for which it is deployed from the machines and network traffic of other entities in the same availability zone. FIG. 12 illustrates an example of a logical network 1295 that defines a VPC for one entity, such as one corporation in a multi-tenant public datacenter, or one department of one corporation in a private datacenter.

As shown, the logical network 1295 includes multiple logical switches 1284 with each logical switch connecting different sets of machines and serving as a different network segment. In some embodiments, the different logical switches belong to different guest clusters. Each logical switch has a port 1252 that connects with (i.e., is associated with) a virtual interface 1265 of a machine 1260. The machines 1260 in some embodiments include VMs and Pods, with each Pod having one or more containers.

The logical network 1295 also includes a logical router 1282 that connects the different network segments defined by the different logical switches 1284. In some embodiments, the logical router 1282 serves as a gateway for the deployed VPC in FIG. 12. In some embodiments, the logical router 1282 includes distributed routing components 1296 and centralize routing components 1297. The distributed routing components in some embodiments are implemented by the routing instances that execute on the host computers and edge appliances, while the central routing components 1297 are implemented by the edge appliances 1210. Each centralized routing component performs one or more services 1291 or are associated with one or more middlebox service nodes that perform one or more services. As such, the centralized routing component are referred to as service routers in some embodiments.

In some embodiments, the centralized and distributed routing components connect through a logical switch 1294 defined on the host computers 1205 and the edge appliances 1210. Also, in some embodiments, the logical router is implemented by a pair of logical nodes 1299, with each node having centralized and distributed components. The pair of nodes can be configured to perform in active/active or active/standby modes in some embodiments. U.S. Pat. No. 9,787,605 describes the gateway implementation of some embodiments in more detail and are incorporated herein by reference.

Figure 13:
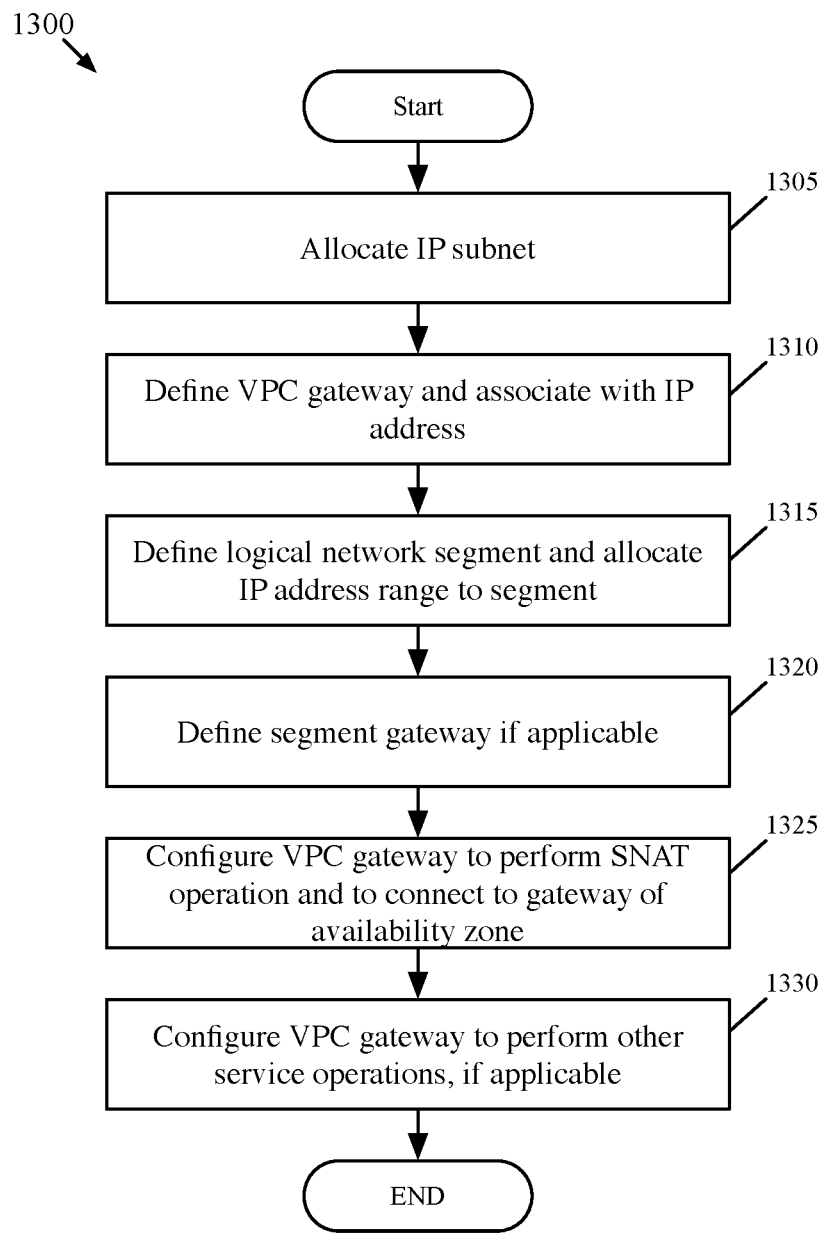
FIG. 13 conceptually illustrates a process for deploying a VPC for an entity.

FIG. 13 conceptually illustrates a process 1300 for deploying a VPC for an entity. In some embodiments, the NCP 1145 directs the SDN managers and controllers to perform this process. In some embodiments, the process 1300 starts when the NCP 1145 receives an API request that requires a new VPC to be deployed. Such an API request in some embodiments might be a request to create a new logical network for a new or existing entity in an availability zone.

As shown, the process 1300 initially allocates (at 1305) an IP subnet for the VPC. In some embodiments, the VPC is part of a supervisor cluster (or namespace) that is a single routing domain with a corresponding IP CIDR (Classless Inter-Domain Routing) that specifies a range of IP addresses internal to the availability zone. The allocated IP subnet in some embodiments is a subnet from this IP CIDR. In conjunction with the allocated IP addresses, the process in some embodiments allocates MAC addresses for virtual interfaces of the VPC. In some embodiments, the VPC is a virtual hybrid cloud (VHC) implemented in a single namespace in the supervisor cluster.

Figure 14:
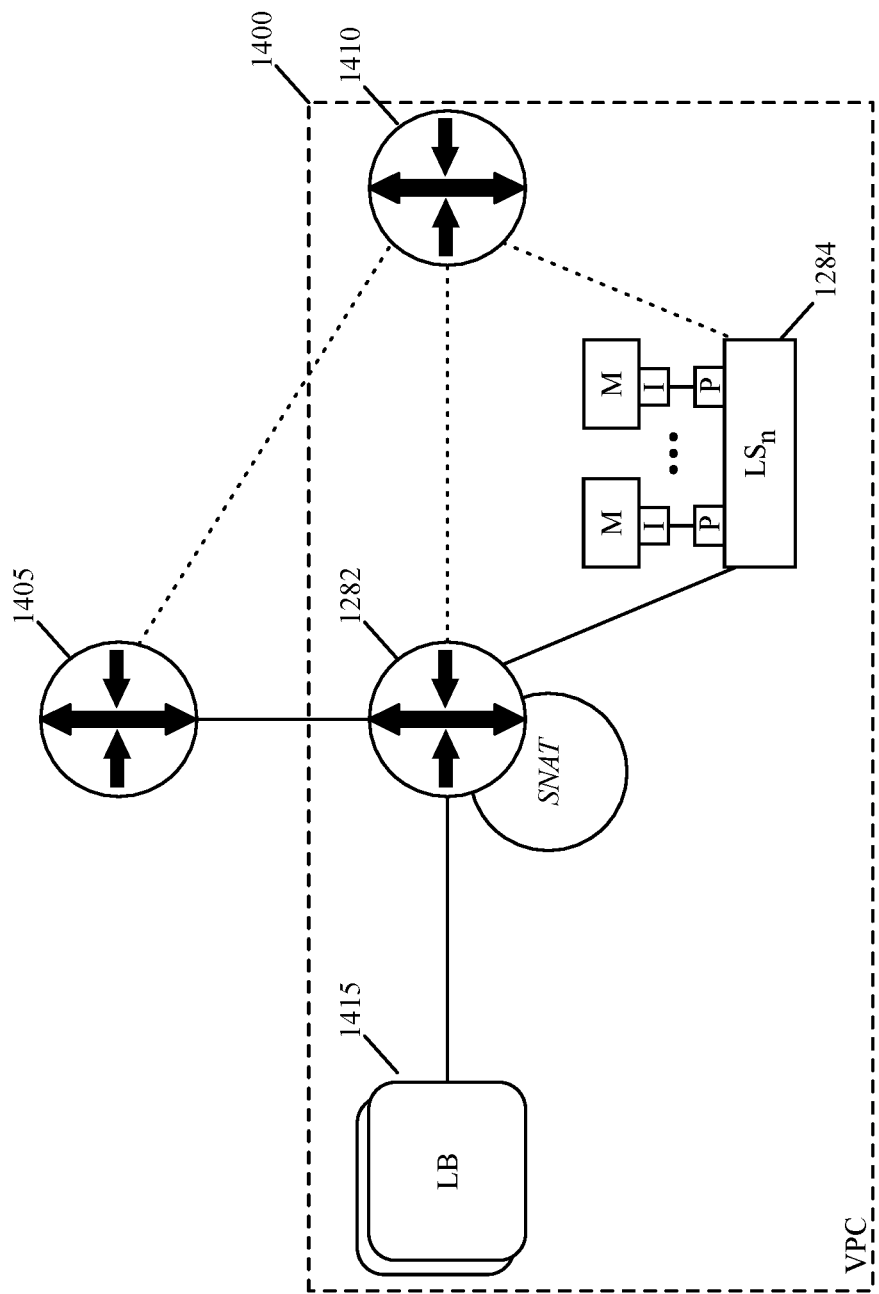
FIG. 14 illustrates an example of a VPC with a gateway router.

Next, at 1310, the process defines a gateway router for the VPC, and associates this gateway router with one or more of the allocated internal IP addresses. These associated addresses are addresses used by VPC switches and routers to reach the gateway. FIG. 14 illustrates an example of a VPC 1400 with a gateway router 1282. In some embodiments, the gateway router 1282 is a logical router that has distributed and centralized components, and/or is implemented as a pair of active/active or active/standby routers, as described above. For example, the VPC gateway router 1282, in some embodiments, is a NSX-T Tier 1 (T1) router that provides centralized SNAT and load balancing services, and a north-south firewall service.

In some embodiments, the VPC gateway router 1282 is configured to connect the VPC with one or more gateway routers 1405 of the availability zone (i.e., of the SDDC set that contains the VPC), in order to connect to a network external to the availability zone. Also, in some embodiments, the VPC gateway router 1282 is configured to communicate with a datacenter gateway router 1405 to connect the VPC gateway 1282 to another VPC gateway of another VPC in order to connect the two VPCs to each other. In some embodiments, the VPC gateway router 1282 is configured to forward packets directly to the gateway routers (not shown) of the other VPCs. In some embodiments, the VPC gateway router 1282 is traversed for cross-namespace traffic and firewall rules (including admin policies and Kubernetes network policies on the namespace) are applied to the cross-namespace traffic. However, since Kubernetes expects a single routing domain for the whole cluster (supervisor namespace, or VPC), SNAT will not be applied to cross-namespace traffic, but only to the traffic to the external network.

At 1315, the process defines a segment of a logical network that it defines for the VPC and allocates a range of IP addresses to this segment. In some embodiments, this allocated range is a contiguous range, while in other embodiments it is not (i.e., the allocated IP addresses in these embodiments are not necessarily sequential). In some embodiments, the defined logical network segment includes a logical switch that is defined to connect a particular set of machines (e.g., VMs and/or Pods). FIG. 14 illustrates an example of a logical switch 1284 that belongs to one logical network segment.

As mentioned above, the VPC logical network in some embodiments includes one or more logical forwarding elements, such as logical switches, routers, gateways, etc. In some embodiments, the SDN controller 1115 implements the logical network by configuring several physical forwarding elements (such as software and hardware switches, routers, bridges, etc.) on host computers, edge appliances, and TOR switches to implement one or more logical forwarding elements (LFEs).

As further described below, the control system in some embodiments configures the PFEs to implement two or more LFEs to connect two or more different subsets of deployed machines that are in two or more sub-networks of the logical networks. In some embodiments, each sub-network can have one or more segments (with each segment implemented by a logical switch), connects a different subset of deployed machines, and provides a set of network elements that satisfy a unique set of connectivity requirements for that subset of machines. For instance, in some embodiments, a first sub-network (e.g., a first logical switch) connects the Kubernetes Pods, while a second sub-network (e.g., a second logical switch) connects VMs. In other embodiments, one sub-network is for VMs needing high-bandwidth, while another sub-network is for regular VMs. Additional examples are provided in U.S. patent application Ser. No. 16/897,652 filed on Jun. 10, 2020.

Some sub-networks of a VPC's logical network in some embodiments can have their own sub-network gateway router. If the sub-network for the segment defined at 1315 has such a sub-network router, the process 1300 defines (at 1320) the sub-network router for the logical network segment. As further described below, the sub-network routers in some embodiments can be configured to forward packets to the VPC gateway router (e.g., router 1282) or the availability-zone router (e.g., router 1405).

FIG. 14 illustrates an example of a sub-network router 1410 with which the logical switch 1284 and the VPC gateway router 1282 are configured to communicate. In some embodiments, the sub-network router 1410 is a distributed router implemented by software router 1255 executed on host computers. FIG. 14 uses dash lines to illustrate the sub-network router 1410 and its connections to the logical switch 1284 and the VPC gateway 1282, in order to signify that the sub-network router 1410 might not be deployed for each sub-network of the VPC logical network. This point is further described in U.S. patent application Ser. No. 16/897,652 filed on Jun. 10, 2020. When a sub-network router is used for a sub-network, all logical switches within the sub-network are connected to the sub-network router (e.g., router 1410) and not the VPC router (e.g., router 1282) in some embodiments.

At 1325, the process 1300 configures the VPC gateway to connect to the availability-zone gateway and to perform source network address translation (SNAT) operations. For instance, in some embodiments, the process configures the VPC gateway 1282 with forwarding rules for the gateway to use to forward certain data message flows to the availability-zone gateway 1405. Also, in some embodiments, the VPC gateway router 1282 is configured to perform SNAT operations to translate internal network addresses used within the VPC to a set of one or more external source network addresses, and to perform the reverse SNAT operations. The external source network addresses in some embodiments are addresses within the availability zone. In some embodiments, the VPC gateway router 1282 does not perform SNAT operations for traffic exchanged between its VPC and another VPC that is deployed in the same availability zone, while in other embodiments, it performs such SNAT operations for some or all of the other VPCs.

In some embodiments, the VPC gateway 1282 is configured to perform other service operations or to use service engines/appliances to perform such other service operations. For such embodiments, the process 1300 configures (at 1330) the VPC gateway to perform other service operations (e.g., load balancing operations, firewall operations, etc.) or to forward data messages to service engines/appliances to perform such other service operations. In some embodiments, the VPC gateway is configured to perform service operations and/or forward data messages to service engines/appliances to perform such service operations, but this configuration, in some embodiments, is not part of the process 1300 when the VPC gateway is deployed and instead is part of another process that is performed subsequently (e.g., upon deployment of machines in the VPC that perform certain services or applications).

In FIG. 14, the VPC gateway 1282 is configured to forward data message flows to a cluster of one or more load balancers 1415 to perform load balancing operations, on ingress and/or egress traffic entering and/or exiting the VPC. The load balancing operations in some embodiments are L4 and/or L7 load balancing operations. In some embodiments, at least a subset of the deployed machines is deployed through Kubernetes, and the L4/L7 load balancing operations implement the load balancing and ingress services of Kubernetes. The VPC gateway in some embodiments performs some or all of such load balancing operations itself. Examples of gateways with load balancing ability are described in U.S. Pat. Nos. 9,787,605 and 10,084,726, which are incorporated herein by reference. The process 1300 ends after 1330.

Resources allocated to the VPC, in some embodiments, are inherited by the guest clusters such that the guest clusters use the resources allocated to the VPC. In some embodiments, the resources include processing resources, storage resources, and network resources (e.g., IP addresses assigned to the VPC, bandwidth allocated to the centralized routing element of the VPC, etc.). Sharing resources, in some embodiments, allows for more efficient use of allocated resources of the VPC and the GCs within the VPC by avoiding overallocation of resources to the individual GCs or the VPC. Resources can be allocated based on an average utilization of the set of VPC and GC resources where the variability of the resource needs are reduced based on the greater number of clusters such that the total load is more likely to be within a smaller range of the average and, accordingly, a smaller percentage of overallocation is expected to provide sufficient resources for most situations. Additionally, the automated deployment described herein and in U.S. patent application Ser. No. 16/897,652 simplifies the work of a system administrator that does not need to allocate resources to each workload machine or guest cluster separately.

Figure 15:
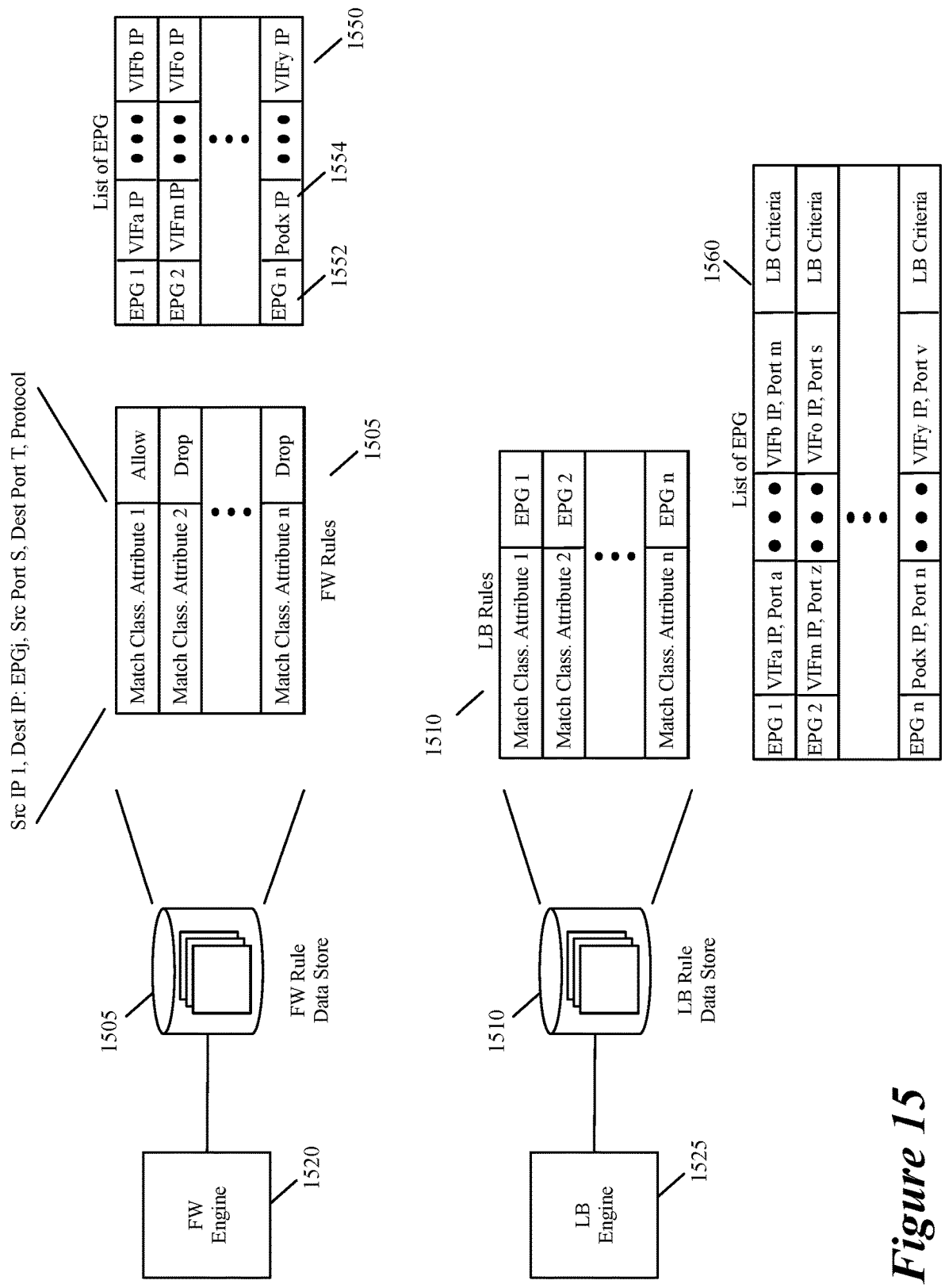
FIG. 15 illustrates an example of firewall rules and load balancing rules that are defined in terms of endpoint groups.

FIG. 15 illustrates an example of firewall rules 1505 and load balancing rules 1510 that are defined in terms of endpoint groups. These rules are processed by a firewall engine 1520 and load balancing engine 1525 executing on a host computer and/or edge appliance. In this example, the endpoint groups are used to define one or more match classification attributes of some or all of the firewall rules 1505 (e.g., the destination IP field of the firewall rule).

As further described in U.S. patent application Ser. No. 16/897,652, some embodiments define each member of an endpoint group in terms of a port address as well as an IP address. In such embodiments, the endpoint group's associated IP and port addresses can be used to define source and/or destination IP and port values of service rules (e.g., firewall rules or other middlebox service rules) that are processed by middlebox service engines to perform middlebox service operations. As new guest clusters are added to a VPC, some embodiments add guest cluster machines as members of the endpoint groups (e.g., add the IP addresses of the GC machines to the endpoint group definition) based on the security or network policies defined for the VPC, the guest cluster, or both the VPC and the guest cluster.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
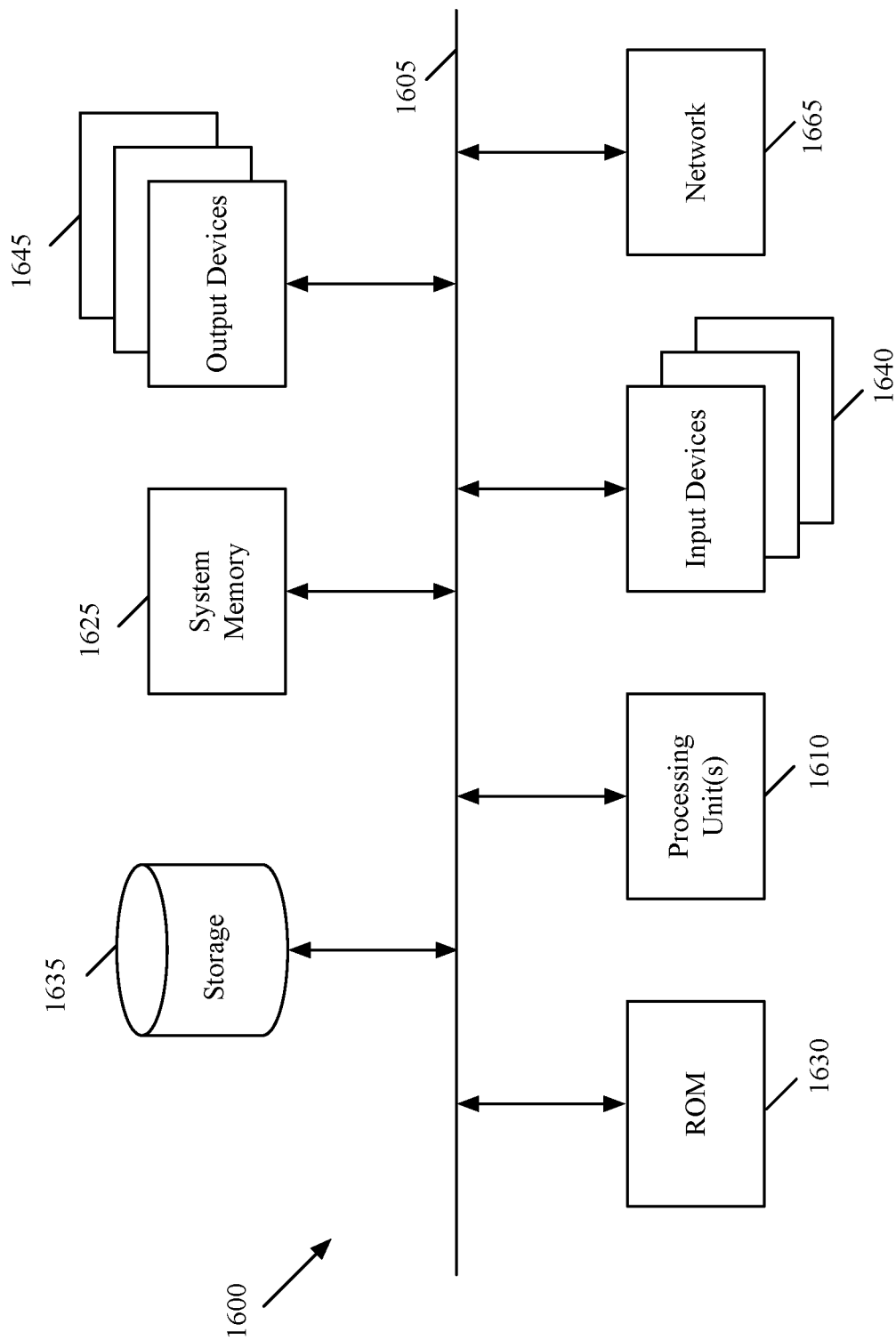
FIG. 16 conceptually illustrates a computer system with which some embodiments of the invention are implemented.

FIG. 16 conceptually illustrates a computer system 1600 with which some embodiments of the invention are implemented. The computer system 1600 can be used to implement any of the above-described hosts, controllers, and managers. As such, it can be used to execute any of the above described processes. This computer system includes various types of non-transitory machine readable media and interfaces for various other types of machine readable media. Computer system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the computer system 1600. For instance, the bus 1605 communicatively connects the processing unit(s) 1610 with the read-only memory 1630, the system memory 1625, and the permanent storage device 1635.

From these various memory units, the processing unit(s) 1610 retrieve instructions to execute and data to process in order to execute the processes of the invention. The processing unit(s) may be a single processor or a multi-core processor in different embodiments. The read-only-memory (ROM) 1630 stores static data and instructions that are needed by the processing unit(s) 1610 and other modules of the computer system. The permanent storage device 1635, on the other hand, is a read-and-write memory device. This device is a non-volatile memory unit that stores instructions and data even when the computer system 1600 is off. Some embodiments of the invention use a mass-storage device (such as a magnetic or optical disk and its corresponding disk drive) as the permanent storage device 1635.

Other embodiments use a removable storage device (such as a floppy disk, flash drive, etc.) as the permanent storage device. Like the permanent storage device 1635, the system memory 1625 is a read-and-write memory device. However, unlike storage device 1635, the system memory is a volatile read-and-write memory, such as random access memory. The system memory stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieve instructions to execute and data to process in order to execute the processes of some embodiments.

The bus 1605 also connects to the input and output devices 1640 and 1645. The input devices enable the user to communicate information and select requests to the computer system. The input devices 1640 include alphanumeric keyboards and pointing devices (also called "cursor control devices"). The output devices 1645 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 16, bus 1605 also couples computer system 1600 to a network 1665 through a network adapter (not shown). In this manner, the computer can be a part of a network of computers (such as a local area network ("LAN"), a wide area network ("WAN"), or an Intranet), or a network of networks (such as the Internet). Any or all components of computer system 1600 may be used in conjunction with the invention.

Some embodiments include electronic components, such as microprocessors, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD–RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Several embodiments were described above that use certain CRDs. One of ordinary skill will realize that other embodiments use other types of CRDs. For instance, some embodiments use LB monitor CRD so that load balancing monitors can be created through APIs that refer to such a CRD. LB monitors in some embodiments provide statistics to reflect the usage and overall health of the load balancers. Also, while several examples above refer to container Pods, other embodiments use containers outside of Pods. Thus, one of ordinary skill in the art would understand that the invention is not to be limited by the foregoing illustrative details, but rather is to be defined by the appended claims.

We claim:

1. A method for deploying a plurality of guest clusters (GCs) for an entity in a datacenter comprising:
deploying a virtual private cloud (VPC) network for a first cluster of machines of the entity in the datacenter, the VPC network comprising a centralized routing element that provides access to a datacenter gateway routing element and provides a set of services for packets traversing a boundary of the first VPC; and
deploying, in the VPC network, a plurality of GCs and a GC network for each GC comprising a plurality of GC machines and a plurality of routing elements implementing a distributed routing element executing on a plurality of host computers along with GC machines, each GC network configured to use the VPC's centralized routing element to access the datacenter gateway routing element, wherein the GC comprises a set of service Pods for which a load balancer of the VPC provides a load balancing service,
wherein the set of service Pods connect to a network segment that is not directly reachable by the load balancer of the VPC, the load balancer of the VPC performs a first load balancing operation over a set of virtual machines (VMs) on which the Pods execute, and a VM in the set of VMs that receives a data message destined to a service Pod in the set of service Pods performs a second load balancing operation over the set of service Pods to select a service Pod in the set of service Pods and provide the data message to the selected service Pod.

2. The method of claim 1, wherein each GC is a Kubernetes cluster.

3. The method of claim 1, wherein the VPC is a Kubernetes cluster.

4. The method of claim 1, wherein the VPC is a non-Kubernetes cluster comprising at least one of virtual machines and non-Kubernetes Pods.

5. The method of claim 1, wherein a set of resources allocated to the VPC network are shared by the plurality of GC networks.

6. The method of claim 5, wherein the shared resources comprise at least one of processing resources, storage resources, and network resources.

7. The method of claim 6, wherein the shared resources comprise network resources and the network resources comprise a set of internet protocol (IP) addresses allocated to the VPC network.

8. The method of claim 1, wherein the VPC network implements a distributed firewall comprising a set of firewall rules and each of the plurality of GC networks inherits the set of firewall rules for implementing the distributed firewall within the GC network.

9. The method of claim 1, wherein the VPC network and a set of GC networks in the plurality of GC networks are deployed by a software defined datacenter manager that is aware of network addresses of each network component in the VPC network and the set of GC networks.

10. A system comprising:
a virtual private cloud (VPC) network for a first cluster of machines of an entity in a datacenter, the VPC network comprising a centralized routing element that provides access to a datacenter gateway routing element and provides a set of services for packets traversing a boundary of the first VPC; and
a plurality of guest clusters (GCs) and a GC network for each GC comprising a plurality of GC machines and a plurality of routing elements implementing a distributed routing element executing on a plurality of host computers along with GC machines, each GC network configured to use the VPC's centralized routing element to access the datacenter gateway routing element, wherein the GC comprises a set of service Pods for which a load balancer of the VPC provides a load balancing service,
wherein the set of service Pods connect to a network segment that is not directly reachable by the load balancer of the VPC, the load balancer of the VPC performs a first load balancing operation over a set of virtual machines (VMs) on which the Pods execute, and a VM in the set of VMs that receives a data message destined to a service Pod in the set of service Pods performs a second load balancing operation over the set of service Pods to select a service Pod in the set of service Pods and provide the data message to the selected service Pod.

* * * * *